(12) United States Patent
Manolakos et al.

(10) Patent No.: US 11,071,098 B2
(45) Date of Patent: Jul. 20, 2021

(54) TECHNIQUES TO JOINTLY CONFIGURE DEMODULATION REFERENCE SIGNALS

(71) Applicant: QUALCOMM Incorporated, San Diego, CA (US)

(72) Inventors: Alexandros Manolakos, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/189,244

(22) Filed: Nov. 13, 2018

(65) Prior Publication Data
US 2019/0159181 A1    May 23, 2019

(30) Foreign Application Priority Data
Nov. 17, 2017    (GR) ............................... 20170100520

(51) Int. Cl.
*H04L 5/00*    (2006.01)
*H04L 27/26*    (2006.01)
(Continued)

(52) U.S. Cl.
CPC ........ *H04W 72/042* (2013.01); *H04B 7/0617* (2013.01); *H04B 7/086* (2013.01);
(Continued)

(58) Field of Classification Search
CPC ... H04L 5/0048; H04L 5/0051; H04L 5/0053; H04L 5/0007; H04L 5/0094; H04L 5/001;
(Continued)

(56) References Cited

U.S. PATENT DOCUMENTS 8,730,903 B2 * 5/2014 Seo .................. H04B 7/155
370/329
9,185,694 B2 * 11/2015 Seo .................. H04L 5/0023
(Continued)

FOREIGN PATENT DOCUMENTS

| EP | 2922225 A1 | 9/2015 |
| WO | WO-2014113546 A1 | 7/2014 |
| WO | WO-2016188312 A1 | 12/2016 |

OTHER PUBLICATIONS

Huawei, et al: "Design of DL DMRS for Data Transmission," 3GPP Draft; R1-1712243, 3rd Generation Partnership Project (3GPP), vol. RAN WG1, No. Prague, Czech Republic; Aug. 21, 2017-Aug. 25, 2017, Aug. 20, 2017, XP051315060, 8 pages, Retrieved from the Internet: URL: http://www.3gpp.org/ftp/Meetings_3GPP_SYNC/RAN1/Docs/ [retrieved on Aug. 20, 2017].
(Continued)

*Primary Examiner* — Sai Aung
(74) *Attorney, Agent, or Firm* — QUALCOMM Incorporated

(57) ABSTRACT

Techniques are described herein for jointly configuring one or more parameters of a plurality of demodulation reference signals (DMRSs) across one or more data channels. A DMRS may be used to estimate one or more channel parameters for a plurality of data channels. To share a DMRS between multiple data channels it may be beneficial to jointly configure one or more parameters of the DMRSs associated with the data channel. A user equipment (UE) may be configured to determine one or more parameters of a plurality of DMRSs using a DMRS pattern configuration that indicates associations between parameters of the different DMRSs. The UE may select a configuration from the one or more configurations of the DMRS pattern configuration based on a variety of factors. For example, the UE may
(Continued)

select a joint DMRS configuration based on whether DMRS sharing is enabled or DMRS bundling is enabled.

33 Claims, 20 Drawing Sheets

(51) Int. Cl.
*H04W 72/04* (2009.01)
*H04B 7/06* (2006.01)
*H04B 7/08* (2006.01)
*H04W 74/04* (2009.01)

(52) U.S. Cl.
CPC .......... *H04L 5/0051* (2013.01); *H04L 5/0055* (2013.01); *H04W 74/04* (2013.01); *H04L 5/001* (2013.01)

(58) Field of Classification Search
CPC ..... H04L 5/005; H04L 5/0035; H04L 5/0044; H04L 5/0023; H04L 5/0055; H04L 5/0057
See application file for complete search history.

(56) References Cited

U.S. PATENT DOCUMENTS

| | | | |
|---|---|---|---|
| 2014/0241150 A1* | 8/2014 | Ng | H04W 48/00 370/229 |
| 2018/0176945 A1* | 6/2018 | Cao | H04L 1/1864 |
| 2019/0141675 A1* | 5/2019 | Blasco Serrano | H04W 4/70 |

OTHER PUBLICATIONS

Motorola Mobility, et al: "UL DMRS for sTTI," 3GPP Draft; R1-1708295_UL DMRS for STTI, 3rd Generation Partnership Project (3GPP), vol. RAN WG1, No. Hangzhou; May 15, 2017-May 19, 2017, May 14, 2017, XP051273488, 2 pages, Retrieved from the Internet: URL: http://www.3gpp.org/ftp/Meetings_3GPP_SYNC/RAN1/Docs/ [retrieved on May 14, 2017].
Partial International Search Report—PCT/US2018/061050—ISA/EPO—dated Feb. 5, 2019.
Potevio: "Uplink DMRS Design for 2-symbol sPUSCH," 3GPP Draft; R1-1708536 Uplink DMRS Design for 2-symbol SPUSCH, 3rd Generation Partnership Project (3GPP), vol. RAN WG1, No. Hangzhou; May 15, 2017-May 19, 2017, May 14, 2017, XP051273728, 3 pages, Retrieved from the Internet: URL: http://www.3gpp.org/ftp/Meetings_3GPP_SYNC/RAN1/Docs/ [retrieved on May 14, 2017].
International Search Report and Written Opinion—PCT/US2018/061050—ISA/EPO—dated Apr. 4, 2019.
Vivo: "Details on DMRS Design", 3GPP Draft; R1-1712842_Details on DMRS Design, 3rd Generation Partnership Project (3GPP), vol. RAN WG1, No. Prague, P.R. Czech; Aug. 21, 2017-Aug. 25, 2017 Aug. 20, 2017, XP051315654, Retrieved from the Internet: URL:http://www.3gpp.org/ftp/Meetings_3GPP_SYNC/RAN1/Docs/ [retrieved on Aug. 20, 2017], section 2.3, figure 5, 6 pages.

* cited by examiner

TECHNIQUES TO JOINTLY CONFIGURE DEMODULATION REFERENCE SIGNALS

CROSS REFERENCE

The present Application for Patent claims the benefit of Greece Provisional Patent Application No. 20170100520 by MANOLAKOS, et al., entitled "TECHNIQUES TO JOINTLY CONFIGURE DEMODULATION REFERENCE SIGNALS," filed Nov. 17, 2017, assigned to the assignee hereof, and expressly incorporated herein.

BACKGROUND

The following relates to wireless communication and techniques to jointly configure demodulation reference signals (DMRSs).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, or apparatuses that support techniques to jointly configure demodulation reference signals (DMRSs). Generally, the described techniques may provide for jointly configuring one or more parameters of a plurality of DMRSs across one or more data channels. A DMRS may be used to estimate one or more channel parameters for a plurality of data channels. To share a DMRS between multiple data channels it may be beneficial to jointly configure one or more parameters of the DMRSs associated with the data channel. A user equipment (UE) may be configured to determine one or more parameters of a plurality of DMRSs using a DMRS pattern configuration that indicates associations between parameters of the different DMRSs. The UE may select a configuration from the one or more configurations of the DMRS pattern configuration based on a variety of factors. For example, the UE may select a joint DMRS configuration based on whether DMRS sharing is enabled or DMRS bundling is enabled across a plurality of data channels.

A method of wireless communication is described. The method may include receiving at least one grant of communication resources that schedules a plurality of data channels and a plurality of DMRSs, each data channel including one or more DMRSs of the plurality of DMRSs, determining a parameter of each DMRS based at least in part on a DMRS pattern configuration, the DMRS pattern configuration indicating that the parameter of at least one DMRS is associated with the parameter of at least one other DMRS, and transmitting the plurality of DMRSs based at least in part on the parameters determined using the DMRS pattern configuration.

An apparatus for wireless communication is described. The apparatus may include means for receiving at least one grant of communication resources that schedules a plurality of data channels and a plurality of DMRSs, each data channel including one or more DMRSs of the plurality of DMRSs, means for determining a parameter of each DMRS based at least in part on a DMRS pattern configuration, the DMRS pattern configuration indicating that the parameter of at least one DMRS is associated with the parameter of at least one other DMRS, and means for transmitting the plurality of DMRSs based at least in part on the parameters determined using the DMRS pattern configuration.

Another apparatus for wireless communication is described. The apparatus may include a processor, memory in electronic communication with the processor, and instructions stored in the memory. The instructions may be operable to cause the processor to receive at least one grant of communication resources that schedules a plurality of data channels and a plurality of DMRSs, each data channel including one or more DMRSs of the plurality of DMRSs, determine a parameter of each DMRS based at least in part on a DMRS pattern configuration, the DMRS pattern configuration indicating that the parameter of at least one DMRS is associated with the parameter of at least one other DMRS, and transmit the plurality of DMRSs based at least in part on the parameters determined using the DMRS pattern configuration.

A non-transitory computer-readable medium for wireless communication is described. The non-transitory computer-readable medium may include instructions operable to cause a processor to receive at least one grant of communication resources that schedules a plurality of data channels and a plurality of DMRSs, each data channel including one or more DMRSs of the plurality of DMRSs, determine a parameter of each DMRS based at least in part on a DMRS pattern configuration, the DMRS pattern configuration indicating that the parameter of at least one DMRS is associated with the parameter of at least one other DMRS, and transmit the plurality of DMRSs based at least in part on the parameters determined using the DMRS pattern configuration.

Some examples of the method, apparatus, and non-transitory computer-readable medium described above may further include processes, features, means, or instructions for determining that DMRS sharing between channels of different mapping types associated with the plurality of DMRSs may be enabled, wherein determining the parameter may be based at least in part on determining that the DMRS sharing may be enabled.

Some examples of the method, apparatus, and non-transitory computer-readable medium described above may further include processes, features, means, or instructions for identifying a prioritization criteria based at least in part on determining that the DMRS sharing may be enabled. Some examples of the method, apparatus, and non-transitory computer-readable medium described above may further include processes, features, means, or instructions for determining that a value of the parameter of each DMRS may be the same based at least in part the prioritization criteria.

In some examples of the method, apparatus, and non-transitory computer-readable medium described above, the prioritization criteria indicates that the parameter may be based on a configuration of a first-in-time DMRS of the plurality of DMRSs or the parameter may be based on a configuration of a specific-type of DMRS of the plurality of DMRSs.

Some examples of the method, apparatus, and non-transitory computer-readable medium described above may further include processes, features, means, or instructions for determining that DMRS bundling between the DMRSs of data channels transmitted across different slots may be enabled, wherein determining the parameter may be based at least in part on determining that the DMRS bundling may be enabled.

Some examples of the method, apparatus, and non-transitory computer-readable medium described above may further include processes, features, means, or instructions for identifying a prioritization criteria based at least in part on determining that the DMRS bundling may be enabled. Some examples of the method, apparatus, and non-transitory computer-readable medium described above may further include processes, features, means, or instructions for determining that the parameter of each DMRS may be the same based at least in part the prioritization criteria.

In some examples of the method, apparatus, and non-transitory computer-readable medium described above, the prioritization criteria indicates that the parameter may be based on a configuration of a first-in-time DMRS of the plurality of DMRSs or the parameter may be based on a configuration of a specific-type of DMRS of the plurality of DMRSs.

Some examples of the method, apparatus, and non-transitory computer-readable medium described above may further include processes, features, means, or instructions for identifying a sequence of DMRS configuration for the plurality of DMRSs based at least in part on the at least one grant of communication resources including more than one DMRS, wherein determining the parameter for each DMRS may be based at least in part on identifying the sequence of DMRS configuration.

Some examples of the method, apparatus, and non-transitory computer-readable medium described above may further include processes, features, means, or instructions for determining that DMRS sharing and DMRS bundling may be not enabled for the plurality of DMRSs in the at least one grant of communication resources, wherein identifying the sequence of DMRS configuration may be based at least in part on determining that the DMRS sharing and the DMRS bundling may be not enabled.

Some examples of the method, apparatus, and non-transitory computer-readable medium described above may further include processes, features, means, or instructions for receiving a negative acknowledgement (NACK) that a data channel transmitted with a first DMRS having a first configuration was not successfully decoded by a base station. Some examples of the method, apparatus, and non-transitory computer-readable medium described above may further include processes, features, means, or instructions for identifying a second configuration for a second DMRS included in a re-transmitted data channel based at least in part on receiving the NACK.

Some examples of the method, apparatus, and non-transitory computer-readable medium described above may further include processes, features, means, or instructions for determining that DMRS sharing between channels of different mapping types associated with the plurality of DMRSs may be enabled or that DMRS bundling between different slots may be enabled. Some examples of the method, apparatus, and non-transitory computer-readable medium described above may further include processes, features, means, or instructions for determining one or more scrambling identifiers used for pseudo-random sequence initializing for the plurality of DMRSs based at least in part on determining that the DMRS sharing or the DMRS bundling may be enabled, wherein determining the parameter may be based at least in part on determining the one or more scrambling identifiers.

Some examples of the method, apparatus, and non-transitory computer-readable medium described above may further include processes, features, means, or instructions for identifying a capability of a UE to may have different DMRS configuration types across channels with different mapping types. Some examples of the method, apparatus, and non-transitory computer-readable medium described above may further include processes, features, means, or instructions for enabling DMRS sharing or DMRS bundling based at least in part on identifying the capability of the UE, wherein determining the parameter may be based at least in part on enabling the DMRS sharing or the DMRS bundling.

Some examples of the method, apparatus, and non-transitory computer-readable medium described above may further include processes, features, means, or instructions for transmitting a message to a base station including the capability of the UE.

Some examples of the method, apparatus, and non-transitory computer-readable medium described above may further include processes, features, means, or instructions for determining that DMRS sharing between a first channel of a first mapping type and a second channel of a second mapping type may be enabled. Some examples of the method, apparatus, and non-transitory computer-readable medium described above may further include processes, features, means, or instructions for identifying a first port associated with a first DMRS of the first channel and a second port associated with a second DMRS of the second channel, the second port being different from the first port. Some examples of the method, apparatus, and non-transitory computer-readable medium described above may further include processes, features, means, or instructions for transmitting the first DMRS using the first port and the second DMRS using the first port and the second port, wherein the second port may be code-division multiplexed with the first port in the second DMRS.

Some examples of the method, apparatus, and non-transitory computer-readable medium described above may further include processes, features, means, or instructions for determining that DMRS sharing between a first channel of a first mapping type and a second channel of a second mapping type may be enabled. Some examples of the method, apparatus, and non-transitory computer-readable medium described above may further include processes, features, means, or instructions for identifying a first set of ports associated with a first DMRS of the first channel and a second set of ports associated with a second DMRS of the second channel, the second set of ports being complementary ports to the first set of ports. Some examples of the method, apparatus, and non-transitory computer-readable medium described above may further include processes, features, means, or instructions for transmitting the first DMRS using the first set of ports and the second DMRS using the first set of ports and the second set of ports.

In some examples of the method, apparatus, and non-transitory computer-readable medium described above, the parameter may be a maximum number of DMRSs, a configuration type of a DMRS, a scrambling identifier of the DMRS, a DMRS location, a number of additional DMRS locations based on a length of a channel associated with the plurality of DMRSs, or a combination thereof.

A method of wireless communication is described. The method may include allocating resources to a plurality of data channels associated with a UE and plurality of DMRSs, each data channel including one or more DMRSs of the plurality of DMRSs, identifying a DMRS pattern configuration for the plurality of DMRSs, and transmitting at least one grant of communication resources that includes the plurality of DMRSs and the DMRS pattern configuration.

An apparatus for wireless communication is described. The apparatus may include means for allocating resources to a plurality of data channels associated with a UE and plurality of DMRSs, each data channel including one or more DMRSs of the plurality of DMRSs, means for identifying a DMRS pattern configuration for the plurality of DMRSs, and means for transmitting at least one grant of communication resources that includes the plurality of DMRSs and the DMRS pattern configuration.

Another apparatus for wireless communication is described. The apparatus may include a processor, memory in electronic communication with the processor, and instructions stored in the memory. The instructions may be operable to cause the processor to allocate resources to a plurality of data channels associated with a UE and plurality of DMRSs, each data channel including one or more DMRSs of the plurality of DMRSs, identify a DMRS pattern configuration for the plurality of DMRSs, and transmit at least one grant of communication resources that includes the plurality of DMRSs and the DMRS pattern configuration.

A non-transitory computer-readable medium for wireless communication is described. The non-transitory computer-readable medium may include instructions operable to cause a processor to allocate resources to a plurality of data channels associated with a UE and plurality of DMRSs, each data channel including one or more DMRSs of the plurality of DMRSs, identify a DMRS pattern configuration for the plurality of DMRSs, and transmit at least one grant of communication resources that includes the plurality of DMRSs and the DMRS pattern configuration.

In some examples of the method, apparatus, and non-transitory computer-readable medium described above, the DMRS pattern configuration indicates a parameter of each of the plurality of the DMRSs may be the same.

In some examples of the method, apparatus, and non-transitory computer-readable medium described above, the DMRS pattern configuration indicates a parameter of each of the plurality of the DMRSs may be independently configured.

Some examples of the method, apparatus, and non-transitory computer-readable medium described above may further include processes, features, means, or instructions for receiving a message indicating a capability of the UE to may have different DMRS configuration types across channels with different mapping types, wherein identifying the DMRS pattern configuration may be based at least in part on receiving the message.

Some examples of the method, apparatus, and non-transitory computer-readable medium described above may further include processes, features, means, or instructions for receiving a DMRS that includes at least one parameter configured according to the DMRS pattern configuration based at least in part on transmitting the at least one grant of communication resources.

In some examples of the method, apparatus, and non-transitory computer-readable medium described above, the DMRS pattern configuration indicates that DMRS sharing may be enabled.

In some examples of the method, apparatus, and non-transitory computer-readable medium described above, the DMRS pattern configuration indicates that DMRS bundling may be enabled.

DETAILED DESCRIPTION

A data channel may have reference signals associated with it, such as demodulation reference signals (DMRSs). A DMRS may be used to estimate channel characteristics (e.g., quality) of the wireless channels over which the data is transmitted. The channel characteristics estimated from the DMRS may be used to perform demodulation and/or decoding of the associated channel. A DMRS may include any reference signal communicated with a data channel (either downlink, uplink, or sidelink). In some cases, a DMRS may be referred to as a DMRS pattern. DMRS or DMRS pattern may have a set of parameters that describe the way the reference signals across a plurality of ports are multiplexed in the frequency, time, and code domain, the scrambling applied to the reference signals, the location of the reference signals in time/frequency with respect to the data, etc.

In some wireless communication systems, one or more parameters of a DMRS may be selected based on one or more characteristics of its associated data channel. When scheduling a plurality of data channels, each DMRS associated with the plurality of data channels may have independently configured parameters. In such cases, having each DMRS be individually-configured may make it difficult for a DMRS to be used to estimate a channel quality of multiple data channels. For example, if the parameters for each DMRS are independent from all other DMRS parameters communicated between the base station and the UE, the base station or the UE may have to perform complex algorithms to associate a first DMRS with a second DMRS to determine more accurate channel state information for a specific data channel.

Techniques are described herein for jointly configuring one or more parameters of a plurality of DMRSs across one or more data channels. A DMRS may be used to estimate one or more channel parameters for a plurality of data channels. To share a DMRS between multiple data channels, it may be beneficial to jointly configure one or more parameters of the DMRSs associated with the data channel. A UE may be configured to determine one or more parameters of a plurality of DMRSs using a DMRS pattern configuration that indicates associations between parameters of the different DMRSs. The UE may select a configuration from the one or more configurations of the DMRS pattern configuration based on a variety of factors. For example, the UE may select a joint DMRS configuration based on whether DMRS sharing is enabled or DMRS bundling is enabled.

Aspects of the disclosure are initially described in the context of a wireless communications system. Aspects of the disclosure are described in the context of DMRS structures, joint DMRS configurations, and a communication scheme. Aspects of the disclosure are further illustrated by and described with reference to apparatus diagrams, system diagrams, and flowcharts that relate to techniques to jointly configure demodulation reference signals.

Figure 1:
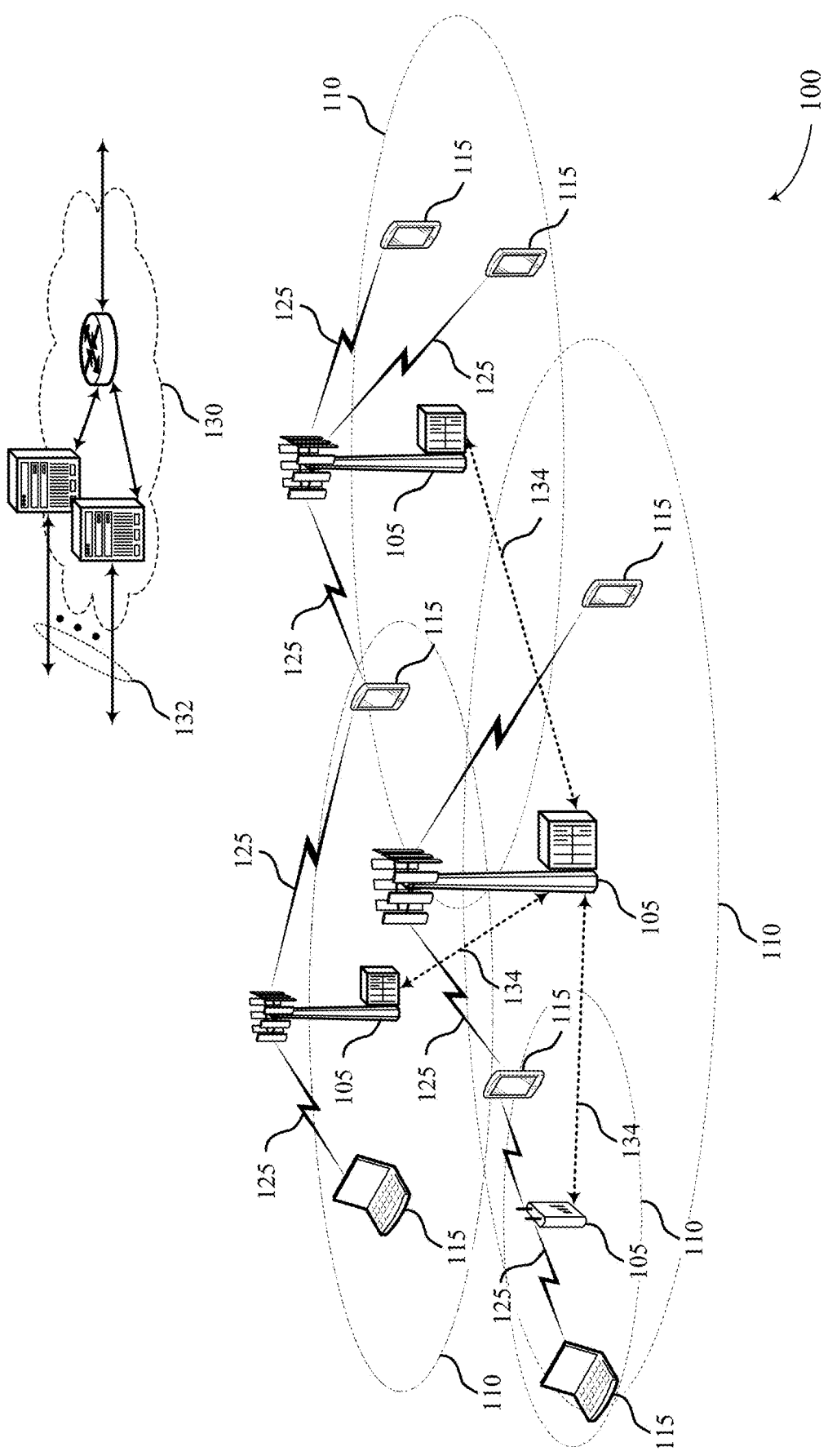
FIG. 1 illustrates an example of a system for wireless communication that supports techniques to jointly configure demodulation reference signals in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform-spread-OFDM (DFT-s-OFDM)).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related.

The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, it may be advantageous to jointly configure parameters of consecutive DMRSs. Jointly configuring parameters of DMRSs may facilitate DMRS sharing between different data channels, DMRS bundling between different data channels across different slots, more efficient processing (e.g., saving time, power, or processing power) when switching between different configurations of DMRS parameters, or a combination thereof. The UE 115 may determine the parameters for a plurality of DMRSs based on a DMRS pattern configuration. In some cases, the parameters for the plurality of the DMRSs are configured to be all the same.

Figure 2:
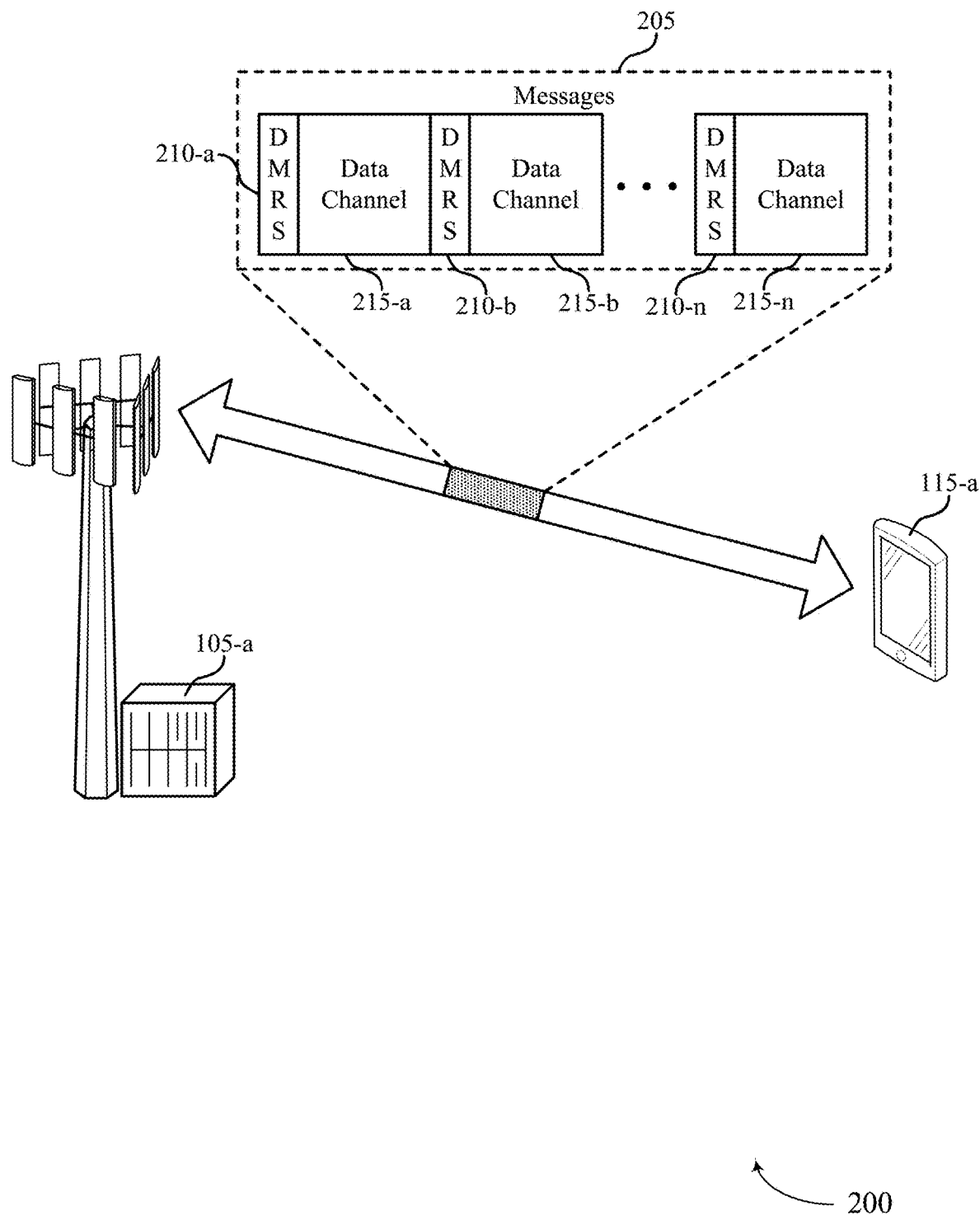
FIG. 2 illustrates an example of a wireless communications system that supports techniques to jointly configure demodulation reference signals in accordance with aspects of the present disclosure.

FIG. 2 illustrates an example of a wireless communications system 200 that supports techniques to configure demodulation reference signals in accordance with various aspects of the present disclosure. In some examples, the wireless communications system 200 may implement aspects of wireless communications system 100. The wireless communications system 200 may illustrate techniques to jointly configure multiple DMRSs across one or more data channels. The wireless communications system 200 may include a communication link between a base station 105-a and one or more UEs represented by a UE 115-a. The base station 105-a and the UE 115-a may exchange one or more messages 205 using one or more data channels 210. In addition, the UE 115-a may transmit one or more DMRSs 215 as part of the messages 205.

A DMRS 215 may be used for channel estimation and for coherent demodulation. In uplink, the DMRS 215 may be transmitted using a physical uplink shared channel (PUSCH) or a physical uplink control channel (PUCCH). In some cases, a DMRS 215 may be transmitted in downlink as well. If the base station 105-a fails to successfully decode the DMRS 215, the base station 105-a may cause the data channel(s) 210 associated with the DMRS 215 (e.g., PUSCH or PUCCH) to not decoded as well. The DMRS 215 may indicate a state channel quality of a radio frequency spectrum associated with its data channel 210 in which the DMRS 215 is being transmitted. Examples of data channels 210 may include PUSCH, PUCCH, physical downlink control channel (PDCCH), physical downlink shared channel (PDSCH), physical broadcast channel (PBCH), physical random access channel (PRACH), or other channels that are physical, transport, or logical channels.

In some cases, one or more parameters of a DMRS 215 may be selected based on one or more characteristics of its associated data channel 210. In such cases, individually determining the parameters of each DMRS may make it difficult for a DMRS to be used across different data channels 210. For example, if the parameters for each DMRS are independent from all other DMRS parameters communicated between the base station 105-a and the UE 115-a, the base station 105-a or the UE 115-a may have to perform complex algorithms to associate a first DMRS with a second DMRS to determine more accurate channel state information for a data channel 210.

Techniques are described herein for jointly configuring one or more parameters of a plurality of DMRSs 215 across one or more data channels 210. In such examples, a DMRS may be used to determine channel state information for multiple data channels 210 and not just the data channel 210 associated with the DMRS 215 multiple DMRSs across one or more data channels. In some cases, the UE 115-a may store a DMRS pattern configuration that indicates associations between parameters of different DMRSs 215. A UE 115-a or a base station 105-a may select a configuration from the one or more configurations of the DMRS pattern configuration based on a variety of factors. For example, the UE 115-a or the base station 105-a may select a joint DMRS configuration based on whether DMRS sharing is enabled or DMRS bundling is enabled.

Through the description, many functions and operations may be described from the perspective of uplink. These functions and operations may also be performed in downlink. A person of ordinary skill in the art would appreciate the modifications of these described techniques to implement them in downlink instead of uplink or vice versa.

Figure 3:
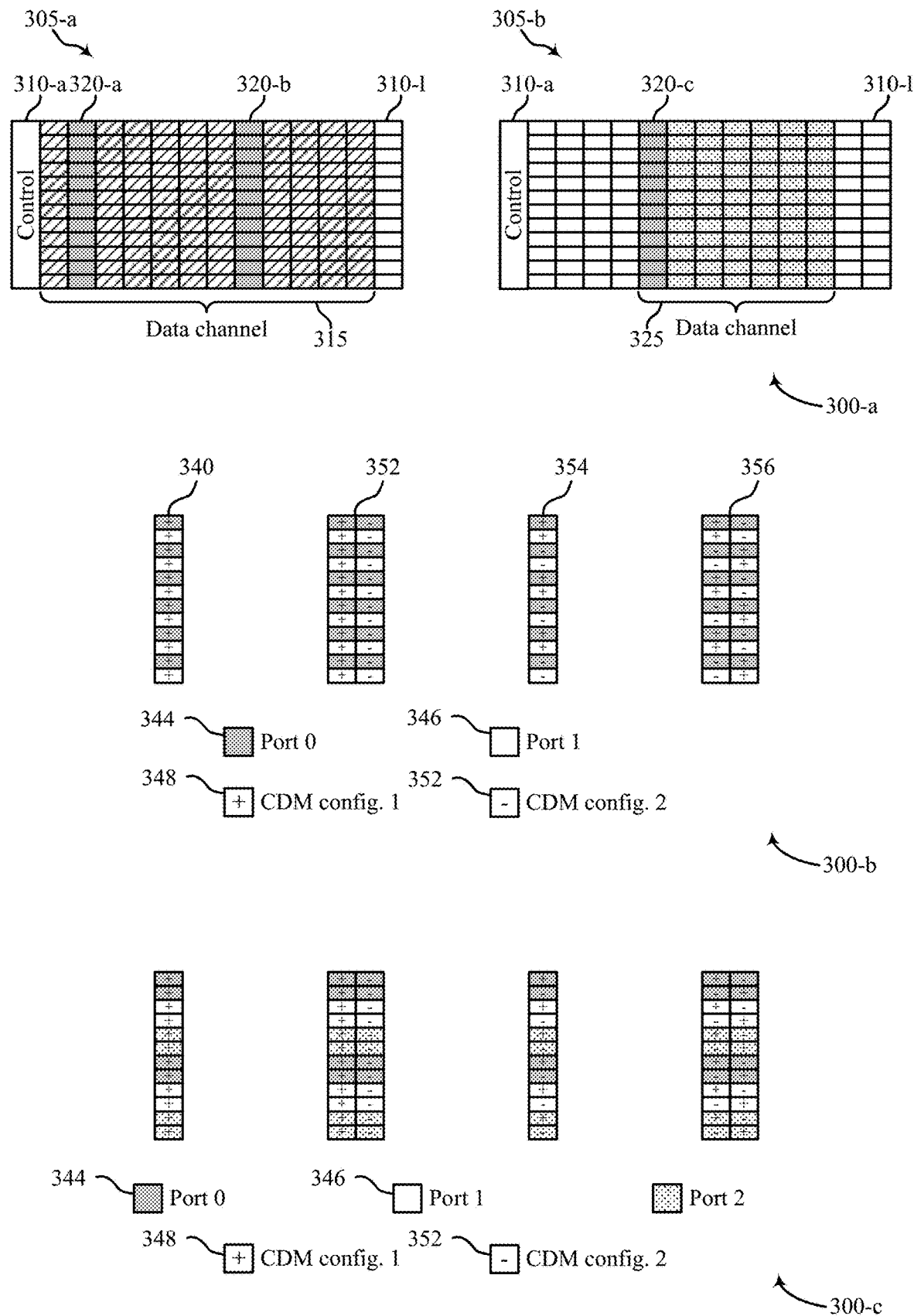
FIG. 3 illustrates an example of DMRS structures that support techniques to jointly configure demodulation reference signals in accordance with aspects of the present disclosure.

FIG. 3 illustrates examples of DMRS structures 300 that support techniques to configure demodulation reference signals in accordance with various aspects of the present disclosure. In some examples, the DMRS structures 300 may implement aspects of the wireless communications systems 100 and 200. The DMRS structures 300 may illustrate one or more possible parameters of a DMRS that may be specified in a DMRS pattern configuration and/or may be jointly configured across multiple DMRSs and multiple data channels.

A DMRS may include one or more parameters that define characteristics of the DMRS. The parameters may be configurable by the base station 105 or the UE 115. The parameters may be configurable based on a type of data channel associated with the DMRS, whether the DMRS is jointly configured with other DMRSs, or other factors. Examples of the parameters of the DMRS may include a maximum number of DMRSs, a number of symbols of the particular instances of the DMRS (e.g., one or two), a configuration type of a DMRS, a scrambling identifier of the DMRS, a DMRS location, a number of additional DMRS locations based on a length of a channel associated with the plurality of DMRSs, whether the DMRS is a front-load DMRS, a number of ports associated with the DMRS, or a combination thereof. Some of parameters may be configured jointly (e.g., a number of symbols that include DMRS, a configuration type of the DMRS, and/or scrambling identifiers for DMRSs for pseudo-random sequence initialization).

The first DMRS structure 300-a illustrates configuration types of DMRS based on a mapping type of its associated data channel. The first DMRS structure 300-a illustrates two slots 305-a and 305-b having a plurality of symbols 310. The first slot 305-a may include a data channel 315 that may be configured using a first mapping type (e.g., mapping type A). The first mapping type may indicate that that a front-load DMRS 320-a is located in a predetermined symbol of the first slot 305-a. For example, the DMRS 320-a may be located in the third symbol and/or the fourth symbol of the first slot 305-a (depending on how many symbols are in the DMRS 320-a). In some cases, the first slot 305-a may include more than one DMRS 320. For example, a second DMRS 320-b may be located in a fixed symbol of the first slot 305-a based on the data channel 315 being configured using a first mapping type. The first slot 305-a may include any number of DMRSs 320 configured based on the first mapping type.

The second slot 305-b of the first DMRS structure 300-a may include a data channel 325 that may be configured using a second mapping type (e.g., mapping type B). A DMRS associated with a data channel mapping type A may have a configuration type 1 and a DMRS associated with a data channel having a mapping type B may have a configuration type 2. In some cases, DMRS configuration type 1 may have higher frequency domain overhead of pilots per layer compared to DMRS configuration type 2. In such cases, the configuration type 1 may be used to get better channel estimation but it comes with the cost of fewer resources available for data transmissions. The second mapping type may indicate that a front-load DMRS 320-c is located in a first symbol of the data channel 325 (e.g., scheduled data transmission). For example, if the data channel 325 is allocated the sixth symbol through the twelfth symbol of the second slot 305-b, the DMRS 320-c may be located in the sixth symbol and/or the fourth symbol of the second slot 305-b (depending on how many symbols are in the DMRS 320-c). In some cases, the second slot 305-b may include more than one data channel 325 and therefore may include more than one DMRS 320. In some cases, a single slot 305 may include data channels of different mapping types.

Second DMRS structures 300-b illustrate DMRS configurations having up to two ports per DMRS instance in a slot, up to two symbols, up to two code division multiplexing schemes, or a combination thereof. A first DMRS configuration 340 occupies a single symbol, includes a first port 344 and a second port 346, and includes a single code division multiplexing scheme (e.g., code division multiplexing scheme 348). A second DMRS configuration 350 occupies two symbols, includes the first port 344 and the second port, and includes two code division multiplexing schemes (e.g., a first code division multiplexing scheme 348 and a second code division multiplexing scheme 352). The illustrative example shows that the second DMRS configuration includes the first symbol being modulated using the first code division multiplexing scheme 348 and the second symbol being modulated using the second code division multiplexing scheme 352. In some cases, however, the first symbol may be modulated using the second code division multiplexing scheme 352 and the second symbol may be modulated using the first code division multiplexing scheme 348.

A third DMRS configuration 354 occupies a single symbol, includes the first port 344 and the second port 346, and includes both the first code division multiplexing scheme 348 and the second code division multiplexing scheme 352. In the third DMRS configuration 354, the different resources blocks of the DMRS are modulated using different code division multiplexing schemes 348, 352 based on a pattern. In some cases, the pattern may be inverted. A fourth DMRS configuration 356 occupies two symbols, includes the first port 344 and the second port, and includes the first code division multiplexing schemes 348 and the second code division multiplexing scheme 352. The illustrative example shows that the fourth DMRS configuration 356 includes the first symbol being modulated according to a first pattern of code division multiplexing schemes and the second symbol being modulated according to a second pattern of code division multiplexing schemes. In some cases, however, the first symbol may be modulated using the second pattern and the second symbol may be modulated using the first pattern.

A DMRS may be configured using one of the representative DMRS configurations 340, 350, 354, 356 based on a number of parameters. For example, a symbol-number parameter may indicate how many symbols the DMRS may occupy, a port parameter may indicate how many ports are associated with the DMRS, and/or a multiplexing parameter may indicate the code division multiplexing pattern being used. In some cases, the second DMRS structures 300-b may include up to eight ports. In such cases, a plurality of slots may include a DMRSs with different pairs of ports.

Third DMRS structures 300-c illustrate DMRS configurations having up to three ports per DMRS instance in a slot, up to two symbols, up to two code division multiplexing schemes, or a combination thereof. The third DMRS structures 300-c are similarly embodied as the second DMRS structures 300-b except that the DMRS configurations 360, 362, 364, 366 include three ports and the specific patterns of code division multiplexing may be different. A person of ordinary skill in the art would appreciate the third DMRS structures 300-c in light of the description of the second DMRS structures. In some cases, the third DMRS structures 300-c may include up to twelve ports. In such cases, a plurality of slots may include a DMRSs with different sets of three ports.

The DMRS structures 300 described herein may be used for downlink communications or for uplink communications. A person of ordinary skill in the art would appreciate modifications that may be applied to these DMRS structures 300 to implement them for downlink communications instead of uplink communications or vice versa.

Figure 4:
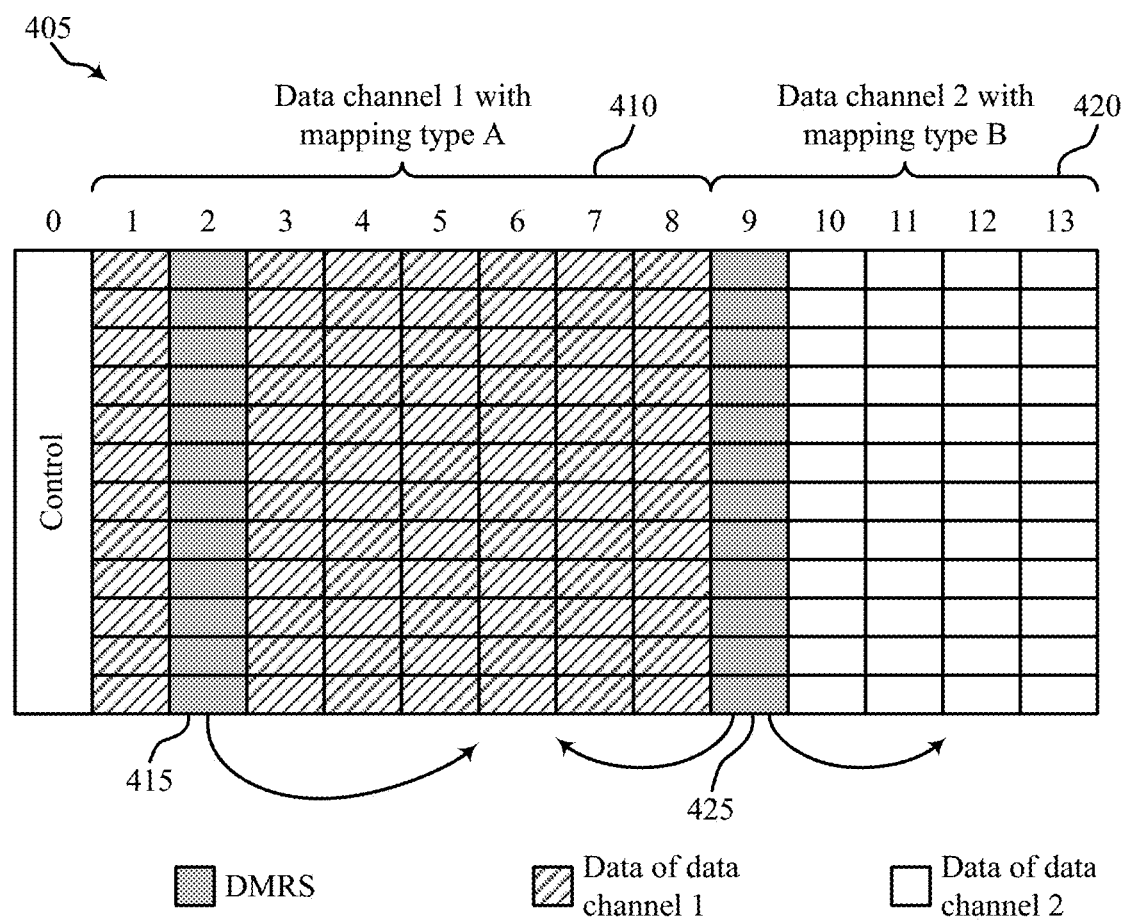
FIG. 4 illustrates an example of a joint DMRS configuration that supports techniques to jointly configure demodulation reference signals in accordance with aspects of the present disclosure.

FIG. 4 illustrates examples of a joint DMRS configuration 400 that supports techniques for signaling a channel state information request and a communication link event in accordance with various aspects of the present disclosure. In some examples, the wireless communications systems 100 and 200 may implement aspects of the joint DMRS configuration 400. In some examples, the joint DMRS configuration 400 may be implemented by a UE 115 or base station 105, or both. For example, the joint DMRS configuration 400 may be used for uplink communications or downlink communications or both. The joint DMRS configuration 400 illustrates DMRS sharing across data channels of different mapping types. DMRS sharing allows a UE 115 or base station 105 receiving a particular data channel to share or use DMRSs associated with other data channels to improve its channel quality estimation of the particular data channel. In some cases, DMRS sharing may occur between data channels having the same or different mapping types. In some cases, DMRS sharing may occur between data channels having the same mapping type and in the same slot.

The joint DMRS configuration 400 includes a slot 405 having a plurality of symbols. The slot 405 may include a first data channel 410 having at least one associated DMRS 415 and a second data channel 420 having at least one associated DMRS 425. The first data channel 410 and the second data channel 420 may include different mapping types or the same mapping type. In the illustrative example, the first data channel 410 may be associated with mapping type A and the second data channel 420 may be associated with mapping type B. In some cases, the plurality of channels may be time-division multiplexed in the same slot (e.g., slot 405) or across multiple slots.

In DMRS sharing, a UE 115 may use a DMRS associated with a different data channel to get a better channel estimation quality for a current data channel by exploiting the DMRS transmitted for another data channel. In such cases, a specific instance of DMRS may be shared between different scheduled data channels. For example, the UE 115 may use the first DMRS 415 and the second DMRS 425 to estimate the channel quality of the first data channel 410. In some cases, DMRS sharing may occur for uplink communications or downlink communications. In some specific cases, a base station 105 may perform the functions described herein.

In DMRS sharing, if the DMRSs 415, 425 are independently configured, the UE 115 may be configured to map the first DMRS 415 to the second DMRS 425. Such a mapping may be needed so that the UE 115 can improve the channel quality estimation. Such mappings may be computation intensive in terms of components used, power used, time used, or a combination thereof. If the UE 115 jointly configures the first DMRS 415 and the second DMRS 425 in DMRS sharing mode, the amount of computations needed to perform the enhanced channel quality estimation for the first data channel 410 may be reduced.

In some cases, the one or more grants of communication resources associated with the data channels 410, 420 may indicate independent parameters for the DMRSs 415, 425. The UE 115 may jointly configure the DMRSs 415, 425 (regardless of the independent parameters) based on DMRS sharing being enabled. When jointly configuring the DMRSs 415, 425, the UE 115 may determine which DMRS parameter(s) to use for the joint configuration based on a DMRS pattern configuration. The DMRS pattern configuration may include a prioritization criteria. In some cases, the DMRS configuration (e.g., DMRS sharing) is configured semi-statically. In some cases, the DMRS sharing is enabled dynamically.

The UE 115 may identify the prioritization criteria based on determining that the DMRS sharing is enabled. In some cases, the prioritization criteria may include using the parameters for the first-in-time DMRS (e.g., the first DMRS 415) for the other DMRSs in the joint configuration (e.g., the second DMRS 425). In some cases, the prioritization criteria may include using the parameters for a DMRS associated with a specified-type of data channel. For example, if the slot 405 includes a first data channel having a first mapping type and a second data channel having a second mapping type, the UE 115 may select the parameters associated with the data channel with the first mapping type (e.g., a default mapping type). In some cases, the prioritization criteria may specify combinations of these criteria. For example, the UE 115 may determine whether two data channels of different mapping types are present. If so, the UE 115 may use the DMRS parameters associated with the data channel of the default mapping type. If not, the UE 115 may use the parameters associated with the first-in-time data channel.

In some cases when DMRS sharing is enabled, the UE 115 or the base station 105 may expect DMRSs that are in a joint configuration to have the same scrambling identifier so that MU-MIMO remains orthogonal. In some cases, using the same scrambling identifier may simply channel quality estimations by allowing the UE 115 or the base station 105 to descramble DMRS symbols using only one identifier instead of multiple identifiers. A scrambling identifier may be used for pseudo-random sequence initialization of the DMRS.

Figure 5:
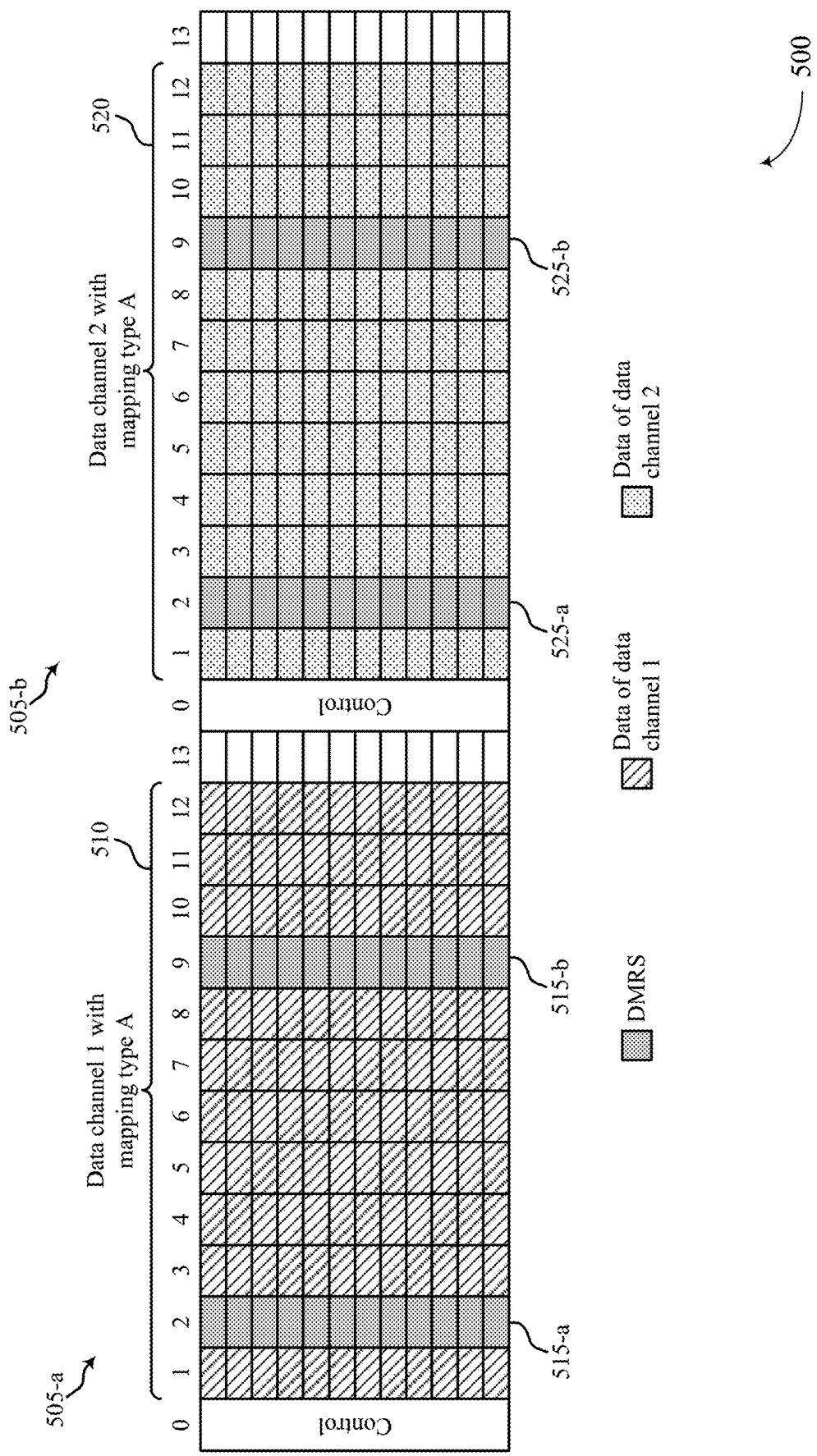
FIG. 5 illustrates an example of a joint DMRS configuration that supports techniques to jointly configure demodulation reference signals in accordance with aspects of the present disclosure.

FIG. 5 illustrates examples of a joint DMRS configuration 500 that supports techniques to configure demodulation reference signals in accordance with various aspects of the present disclosure. In some examples, the wireless communications systems 100 and 200 may implement aspects of the joint DMRS configuration 500. In some examples, the joint DMRS configuration 500 may be implemented by a UE 115 or base station 105, or both. For example, the joint DMRS configuration 500 may be used for uplink communications or downlink communications or both.

The joint DMRS configuration 500 illustrates DMRS bundling between the DMRSs of different data channels transmitted across different slots. The joint DMRS configuration 500 may additionally facilitate DMRS sharing between different data channels. DMRS bundling allows a UE 115 or base station 105 receiving a particular data channel to share or use DMRSs associated with other data channels in other slots to improve its channel quality estimation of the particular data channel. DMRS bundling may occur when the UE 115 is scheduled with two slots (e.g., in slot aggregation with one or more transport blocks). DMRS bundling may be done with data channels of the same mapping type or data channels of different mapping types. In some cases, DMRS sharing may be combined with DMRS bundling.

The joint DMRS configuration 500 includes a plurality of slots 505 (e.g., a first slot 505-*a* and a second slot 505-*b*), each slot 505 having a plurality of symbols. The first slot 505-*a* may include a first data channel 510 having at least one associated DMRS 515 and the second slot 505-*b* may include a second data channel 520 having at least one associated DMRS 525. The first data channel 510 and the second data channel 520 may include different mapping types or the same mapping type. In the illustrative example, the first data channel 510 may be a mapping type A and the second data channel 520 may be the mapping type A.

In DMRS bundling, a UE 115 may use a DMRS associated with a different data channel in a different slot to get a better channel estimation quality for a current data channel. In such cases, a specific instance of DMRS may be shared between different scheduled data channels in different slots. For example, the UE 115 may use the first DMRS 515 and the second DMRS 525 to estimate the channel quality of the first data channel 510. In some cases, multiple DMRSs may be aggregated across multiple slots and/or multiple data channels to provide channel quality estimation for a single data channel.

In DMRS bundling, if the DMRSs 515, 525 are independently configured, the UE 115 may be configured to map the first DMRS 515 to the second DMRS 525. Such a mapping may be needed so that the UE 115 can improve the channel quality estimation. Such mappings may be computation intensive in terms of components used, power used, time used, or a combination thereof. If the UE 115 jointly configures the first DMRS 515 and the second DMRS 525 in DMRS bundling mode, the amount of computations needed to perform the enhanced channel quality estimation for the first data channel 510 may be reduced.

In some cases, the one or more grants of communication resources associated with the data channels 510, 520 may indicate independent parameters for the DMRSs 515, 525. The UE 115 may jointly configure the DMRSs 515, 525 (regardless of the independent parameters) based on DMRS bundling being enabled. When jointly configuring the DMRSs 515, 525, the UE 115 may determine which DMRS parameter(s) to use for the joint configuration based on a DMRS pattern configuration. The DMRS pattern configuration may include a prioritization criteria. In some cases, the DMRS configuration (e.g., DMRS bundling) is configured semi-statically. In some cases, the DMRS bundling is enabled dynamically.

The UE 115 may identify the prioritization criteria based on determining that DMRS bundling is enabled. In some cases, the prioritization criteria may include using the parameters for the first-in-time DMRS (e.g., the first DMRS 515) for the other DMRSs in the joint configuration (e.g., the second DMRS 525). In some cases, the prioritization criteria may include using the parameters for a DMRS associated with a specified-type of data channel. For example, if the slot 505 includes a first data channel having a first mapping type and a second data channel having a second mapping type, the UE 115 may select the parameters associated with the data channel with the first mapping type (e.g., a default mapping type). In some cases, the prioritization criteria may use combinations of these criteria. For example, the UE 115 may determine whether two data channels of different mapping types are present. If so, the UE 115 may use the DMRS parameters associated with the data channel of the default mapping type. If not, the UE 115 may use the parameters associated with the first-in-time data channel.

In some cases when DMRS bundling is enabled, the UE 115 or the base station 105 may expect DMRSs that are in a joint configuration to have the same scrambling identifier so that the MU-MIMO remains orthogonal. In some cases, using the same scrambling identifier may simply channel quality estimations by allowing the UE 115 or the base station 105 to descramble DMRS symbols using only one identifier instead of multiple identifiers.

Figure 6:
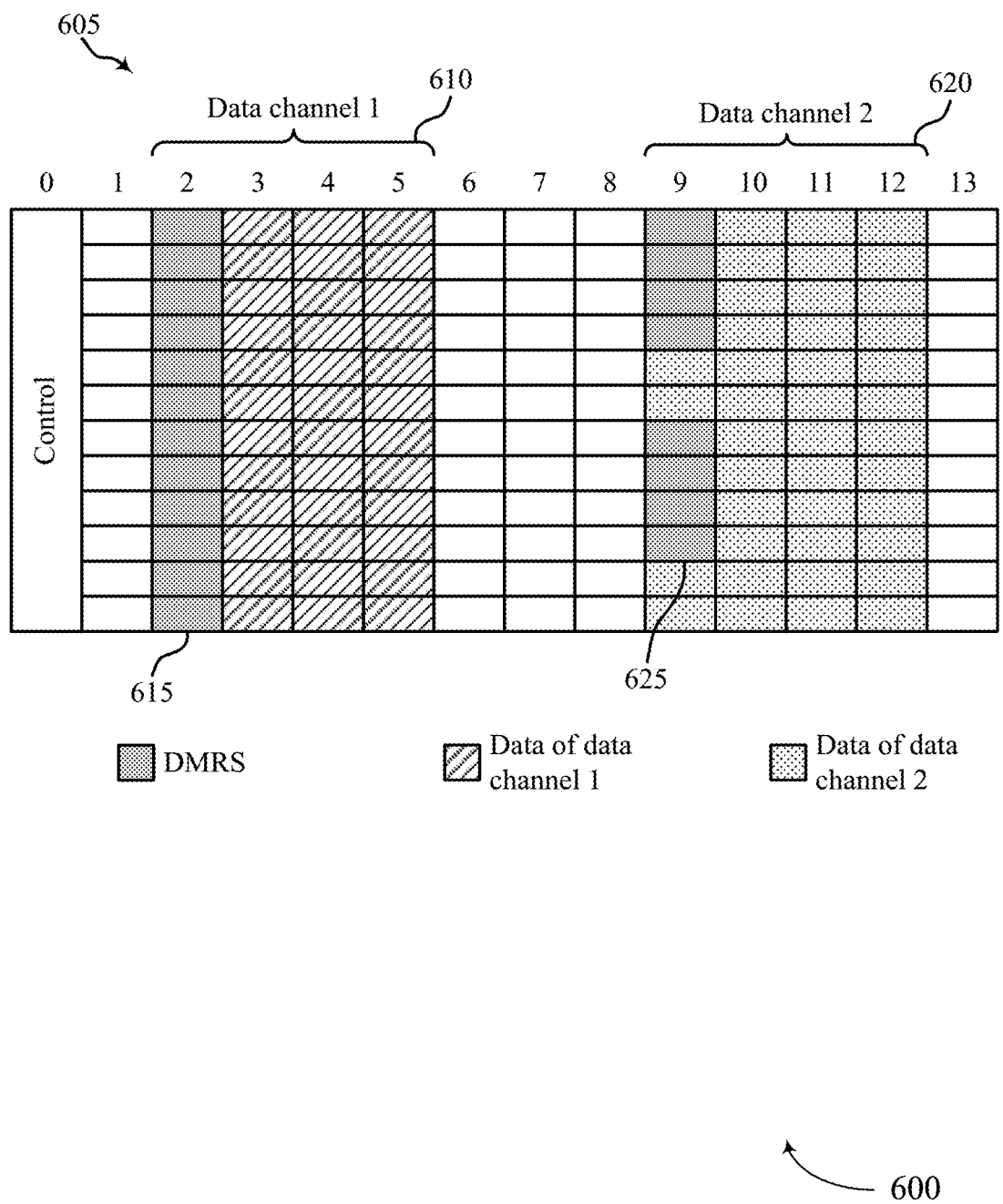
FIG. 6 illustrates an example of a joint DMRS configuration that supports techniques to jointly configure demodulation reference signals in accordance with aspects of the present disclosure.

FIG. 6 illustrates examples of a joint DMRS configuration 600 that support techniques to configure demodulation reference signals in accordance with various aspects of the present disclosure. In some examples, the wireless communications systems 100 and 200 may implement aspects of the joint DMRS configuration 600. In some examples, the joint DMRS configuration 600 may be implemented by a UE 115 or base station 105, or both. For example, the joint DMRS configuration 600 may be used for uplink communications or downlink communications or both.

The joint DMRS configuration 600 illustrates a joint configuration of DMRSs that may occur when neither DMRS sharing nor DMRS bundling are enabled. In such circumstances, the UE 115 may still want to configure the DMRSs jointly for a variety of reasons. For example, it may be difficult for the UE 115 to rapidly switch between different DMRS configurations. In such examples, a joint configuration may reduce the processing load experienced by the UE 115.

The joint DMRS configuration 600 includes a slot 605 having a plurality of symbols. The slot 605 may include a first data channel 610 having at least one associated DMRS 615 and a second data channel 620 having at least one associated DMRS 625. The first data channel 610 and the second data channel 620 may include different mapping types or the same mapping type.

To use the joint DMRS configuration 600, the UE 115 may determine that DMRS sharing is not enabled, DMRS bundling is not enabled, or consecutive data channel scheduling is occurring, or a combination thereof. The UE 115 may identify a sequence of DMRS configurations for the plurality of DMRSs (e.g., DMRSs 615, 625). In some cases, a sequence of DMRS configuration may indicate that the first-in-time DMRS has a first configuration, that a next DMRS has a second configuration, and so forth. In some sequences, the configurations of DMRSs may be the same, and in other sequences, the configurations of DMRSs may be different, or any combination thereof. For example, the first DMRS 615 has a first configuration with a first set of parameters and the second DMRS 625 has a second configuration with a second set of parameters different from the first configuration. In some cases, the UE 115 may determine a mapping type of the first data channel 610 and base the sequence based on the mapping type of the first data channel 610.

The UE 115 may determine the sequence based on whether an acknowledgement (ACK) or negative acknowledgement (NACK) was received indicating whether a DMRS was successfully decoded. If a NACK is received indicating that the first DMRS 615 was not successfully decoded, the UE 115 may determine the configuration associated with the first DMRS 615 (e.g., configuration type 1 or configuration type 2). In some cases, the UE 115 may select a different configuration for re-transmitting the first DMRS 615. In other cases, the UE 115 may determine whether the current configuration of the first DMRS 615 is a preferred configuration. If the current configuration of the first DMRS 615 is the preferred configuration, the UE 115 may retransmit the first DMRS 615 using the same configuration (e.g., the preferred configuration).

In some cases, a certain configuration for the DMRS may better in certain situations. For example, for high spectral efficiencies, the DMRS associated with mapping type A, which may have a larger overhead per layer, and may be needed to get a better channel estimation. In some cases, the UE 115 may identify a rank, spectral efficiency, and/or a modulation coding scheme for the data channel or DMRS and select the configuration and/or the sequence of configurations based on this information.

In some cases when neither DMRS sharing nor DMRS bundling is enabled, the UE 115 or the base station 105 may expect DMRSs that are in a joint configuration to have the same scrambling identifier so that the MU-MIMO remains orthogonal. In some cases, using the same scrambling identifier may simply channel quality estimations by allowing the UE 115 or the base station 105 to descramble DMRS symbols using only one identifier instead of multiple identifiers.

Figure 7:
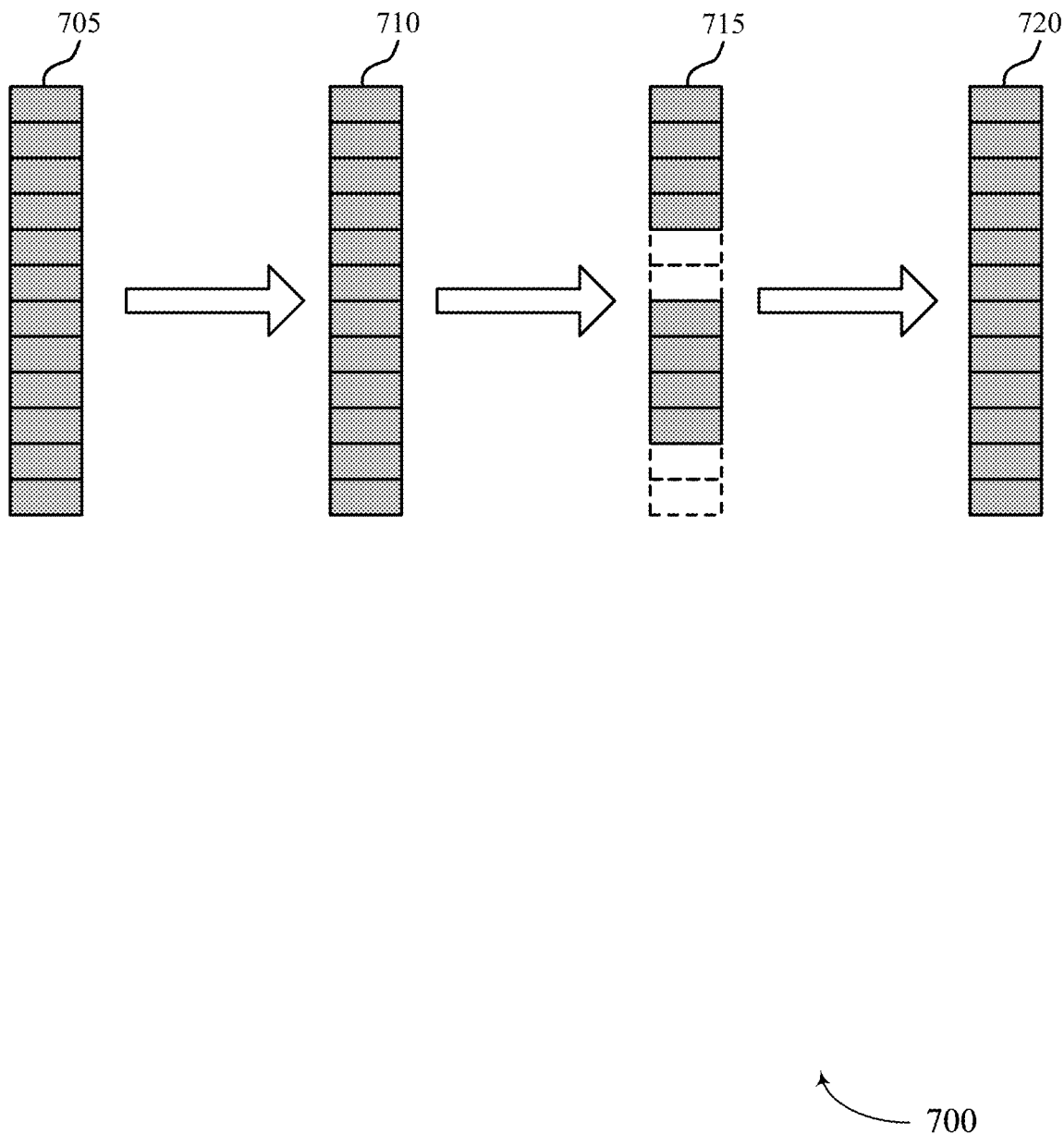
FIG. 7 illustrates an example of a joint DMRS configuration that supports techniques to jointly configure demodulation reference signals in accordance with aspects of the present disclosure.

FIG. 7 illustrates examples of a joint DMRS configuration 700 that support techniques to configure demodulation reference signals in accordance with various aspects of the present disclosure. In some examples, the wireless communications systems 100 and 200 may implement aspects of the joint DMRS configuration 700. In some examples, the joint DMRS configuration 700 may be implemented by a UE 115 or base station 105, or both. For example, the joint DMRS configuration 700 may be used for uplink communications or downlink communications or both.

The joint DMRS configuration 700 illustrates how a UE 115 or a base station 105 can perform an exception to a joint DMRS configuration. In some cases where DMRS sharing and/or DMRS bundling is enabled, a UE 115 or base station 105 may be expecting a certain set of configurations, either all of the configurations may be the same or the configurations may be arranged in a predetermined pattern. In some cases, however, at least one of the DMRSs may need to be configured independently of the other DMRSs in the joint configuration. For example, the joint DMRS configuration 700 includes a first DMRS 705 having a first configuration based on a DMRS pattern configuration, a second DMRS 710 having the first configuration, a third DMRS 715 having a second configuration different from the first configuration, and a fourth DMRS 720 having the first configuration. The second configuration may not be based on the DMRS pattern configuration.

In some cases, the UE 115 may identify a need for specific DMRS configuration different from the one specified in a DMRS pattern configuration. For example, after receiving a NACK, the UE 115 may identify a new configuration to improve the likelihood that the second DMRS will be successfully decoded. In some cases, the UE 115 may transmit a message to a base station 105 indicating the parameters for the independently configured DMRS (e.g., the third DMRS 715).

Figure 8:
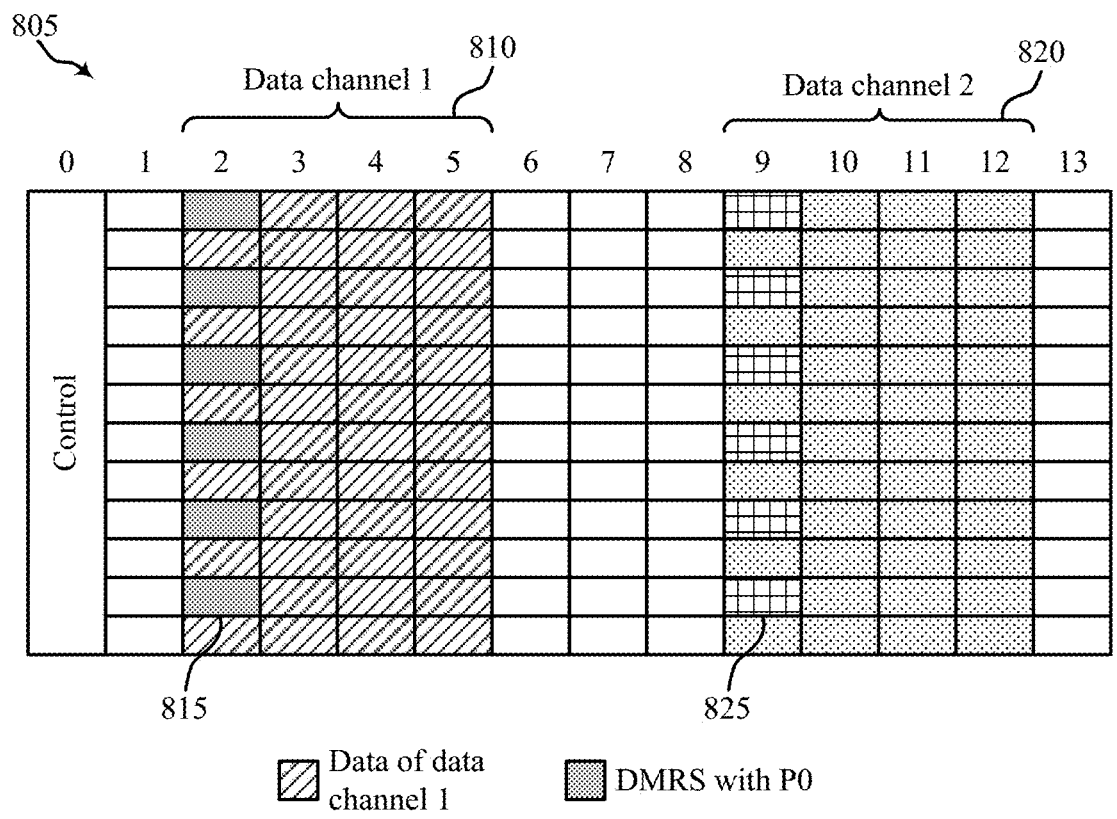
FIG. 8 illustrates an example of a joint DMRS configuration that supports techniques to jointly configure demodulation reference signals in accordance with aspects of the present disclosure.

FIG. 8 illustrates examples of a joint DMRS configuration 800 that support techniques to configure demodulation reference signals in accordance with various aspects of the present disclosure. In some examples, the wireless communications systems 100 and 200 may implement aspects of the joint DMRS configuration 800. In some examples, the joint DMRS configuration 800 may be implemented by a UE 115 or base station 105, or both. For example, the joint DMRS configuration 800 may be used for uplink communications or downlink communications or both.

The joint DMRS configuration 800 includes a slot 805 having a plurality of symbols. The slot 805 includes a first data channel 810 having a first DMRS 815 and a second data channel 820 having a second DMRS 825. The joint DMRS configuration 800 illustrates an example where the first DMRS 815 includes first port (e.g., P0) different from a second port (e.g., P1) of a second DMRS 825. In some cases, the first port P0 may be associated with the first data channel and the second port P1 may be associated with the second data channel 820. In these types of situations, the DMRSs 815, 825 may not be shared between the different data channels 810, 820 because the ports are different. In these cases, the first port P0 may only be used for channel estimation of the first data channel 810 and the second port P1 may only be used for channel estimation of the second data channel 820. The reason that the second DMRS 825 may be used for channel estimation of both channels is because the second DMRS 825 includes both ports.

When such cases occur, the UE 115 may configure at least one of the DMRSs 815, 825 to include both ports associated with the first data channel 810 and the ports associated with the second data channel 820. For example, the second DMRS 825 may be configured to include the first port P0 and the second port P1. In this specific example, the second DMRS 825 may be used for channel estimation for both the first data channel 810 and the second data channel 820, but the first DMRS 815 may only be used for channel estimation of the first data channel 810. In some cases, the first DMRS 815 may be configured with both ports. In some cases, all of the DMRSs 815, 825 may be configured with all of the ports in the set of jointly configured DMRSs. In some cases, the UE 115 may configure later-in-time DMRSs with the ports associated with earlier-in-time DMRSs.

To combine the ports associated with different data channels, the UE 115 may code division multiplex the ports together into a single DMRS (e.g., the second DMRS 825). By using code division multiplexing of the two ports, the UE 115 may avoid changing the rate matching of the second data channel 820. In some cases of jointly configuring DMRSs, the UE 115 may assume that the second DMRS 825 may be used for channel estimation for the first data channel 810. As such, using both ports in the second DMRS 825 may be useful.

Figure 9:
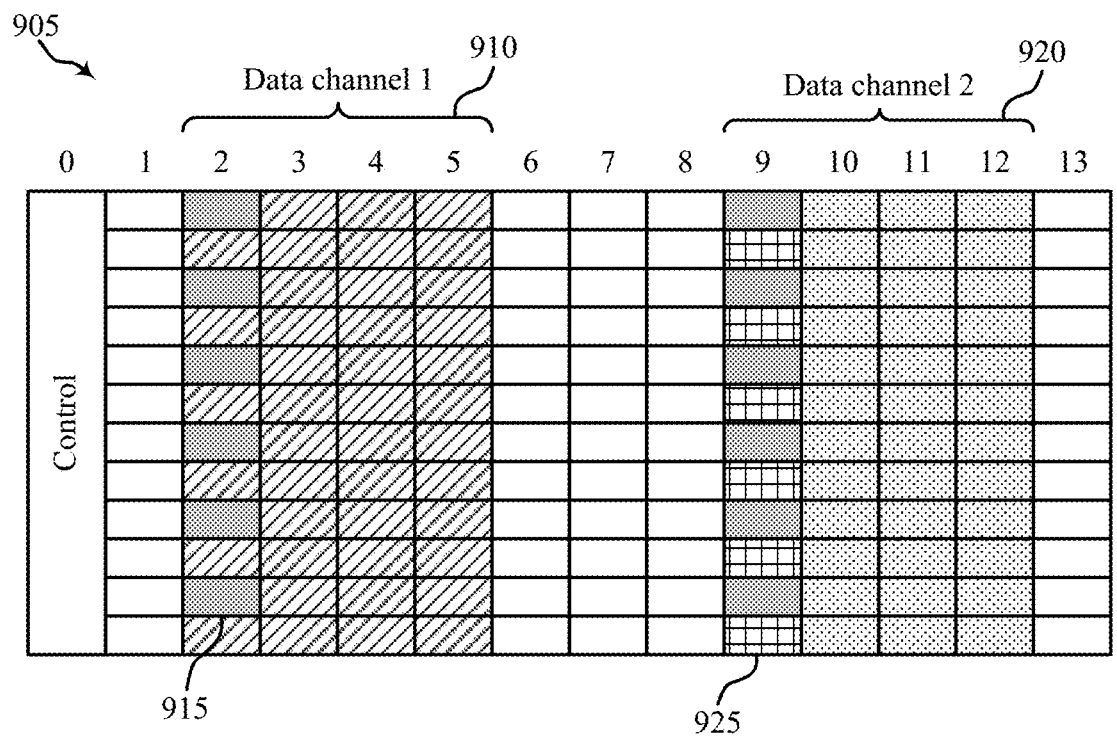
FIG. 9 illustrates an example of a joint DMRS configuration that supports techniques to jointly configure demodulation reference signals in accordance with aspects of the present disclosure.

FIG. 9 illustrates examples of a joint DMRS configuration 900 that support techniques to configure demodulation reference signals in accordance with various aspects of the present disclosure. In some examples, the wireless communications systems 100 and 200 may implement aspects of the joint DMRS configuration 900. In some examples, the joint DMRS configuration 900 may be implemented by a UE 115 or base station 105, or both. For example, the joint DMRS configuration 900 may be used for uplink communications or downlink communications or both.

The joint DMRS configuration 900 includes a slot 905 having a plurality of symbols. The slot 905 includes a first data channel 910 having a first DMRS 915 and a second data channel 920 having a second DMRS 925. The joint DMRS configuration 900 illustrates an example where the first DMRS 915 includes a first set of ports (e.g., P0 and P1) different from a second set of ports (e.g., P2 and P3) of a second DMRS 925. In some cases, the first set of ports may be associated with the first data channel and the second set of ports may be associated with the second data channel 920. In some of these cases, the two ports (P0 and P1) of the first set of ports may be code division multiplexed together in the first DMRS 615 and the two ports (P2 and P3) of the second set of ports may be code divisional multiplexed together for the second DMRS 625. In these types of situations, the DMRSs 915, 925 may not be shared between the different data channels 910, 920 because the ports are different.

When such cases occur, the UE 115 may configure at least one of the DMRSs 915, 925 to include the first set of ports associated with the first data channel 910 and the second set of ports associated with the second data channel 920. For example, the second DMRS 925 may be configured to include the first port P0 code division multiplexed with the second port P1 and the third port P2 code division multiplexed with the fourth port P3. In this specific example, the second DMRS 925 may be used for channel estimation for both the first data channel 910 and the second data channel 920, but the first DMRS 915 may only be used for channel estimation of the first data channel 910. In some cases, the first DMRS 915 may be configured with both ports. In some cases, all of the DMRSs 915, 925 may be configured with all of the ports in the set of jointly configured DMRSs. In some cases, the UE 115 may configure later-in-time DMRSs with the ports associated with earlier-in-time DMRSs. In some cases, the second set of ports are the complement ports to the first set of ports. In these cases, the first set of ports may only be used for channel estimation of the first data channel 910 and the second set of ports may only be used for channel estimation of the second data channel 920. The reason that the second DMRS 925 may be used for channel estimation of both channels is because the second DMRS 925 includes both sets of ports.

To combine the sets of ports associated with different data channels, the UE 115 may assign some resources blocks of a DMRS (e.g., the second DMRS 925) to the code division multiplexed first set of ports and assign other resource blocks of the DMRS to the conde division multiplexed second set of ports. In this manner, the UE 115 may avoid changing the rate matching of the second data channel 920. In some cases of jointly configuring DMRSs, the UE 115 may assume that the second DMRS 925 may be used for channel estimation for the first data channel 910. As such, using both ports in the second DMRS 925 may be useful.

Figure 10:
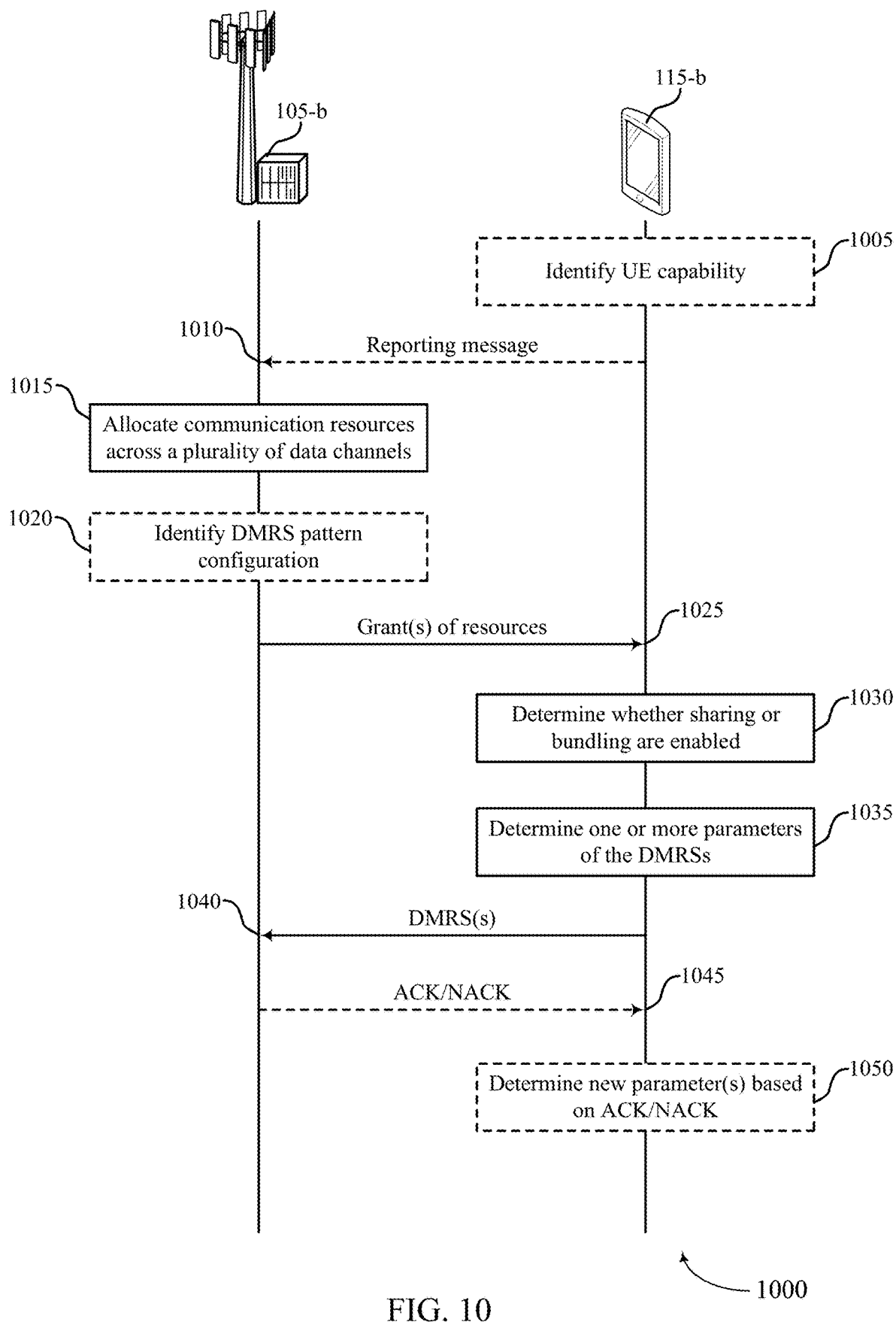
FIG. 10 illustrates an example of a communication scheme that supports techniques to jointly configure demodulation reference signals in accordance with aspects of the present disclosure.

FIG. 10 illustrates an example of a communication scheme 1000 that supports techniques to configure demodulation reference signals in accordance with various aspects of the present disclosure. In some examples, the wireless communications systems 100 and 200 may implement aspects of the communication scheme 1000. The communication scheme 1000 illustrates functions and communications of a base station 105-*b* and a UE 115-*b* for DMRS transmissions in an uplink context. In some cases, the functions and communications of the communication scheme 1000 may be applied in a downlink context.

At block 1005, the UE 115-*b* may optionally identify a UE capability for jointly configuring DMRSs across multiple data channels. The UE 115-*b* may optionally report these capabilities in a reporting message 1010 transmitted to the base station 105-*b*.

At block 1015, the base station 105-*b* may allocate communication resources to the UE 115-*b* (both in uplink and downlink) across a plurality of data channels. In some cases, these communication resources and data channels may be spread across multiple slots. Each of the separately scheduled data channels may include at least one DMRS. The base station 105-*b* may determine parameters for each DMRS of the plurality of data channels. Examples of the parameters of the DMRS may include a maximum number of DMRSs, a number of symbols of the particular instances of the DMRS (e.g., one or two), a configuration type of a DMRS, a scrambling identifier of the DMRS, a DMRS location, a number of additional DMRS locations based on a length of a channel associated with the plurality of DMRSs, whether the DMRS is a front-load DMRS, a number of ports associated with the DMRS, or a combination thereof. In some cases, parameters of the DMRSs may be based on the mapping type of the data channel associated with the DMRS. The base station 105-*b* may determine parameters for each DMRS independently, in some cases.

At block 1020, the base station 105-*b* may optionally identify a DMRS pattern configuration for the plurality of DMRSs based on the DMRSs being jointly configured. The base station 105-*b* may determine whether the DMRSs should be jointly configured based on scheduling multiple DMRSs, DMRS sharing being enabled, DMRS bundling being enabled, receiving the reporting message 1010 that indicates the UE 115-*a* is capable of joint DMRS configurations, or a combination thereof. The DMRS pattern configuration may indicate how the plurality of DMRSs should be jointly configured (e.g., every DMRS should use the parameters of the first-in-time DMRS or every DMRS should use the parameters of a specific-type of DMRS). In some cases, the DMRS pattern configuration is determined and/or applied after the parameters for each DMRS have been individually determined.

The base station 105-*b* may transmit one or more grants of communication resources to the UE 115-*b* for the various data channels and DMRSs. The grant of communication resources may include information about parameters for the associated DMRSs. In some cases, the base station 105-*b* may transmit a grant for each data channel being scheduled. In some cases, the grant of communication resources may also include information about the DMRS pattern configuration, enabling/disabling DMRS sharing, enabling/disabling DMRS bundling, or a combination thereof.

At block 1030, the UE 115-*b* may determine whether DMRS sharing and/or DMRS bundling are enabled. Many joint configurations for the plurality of DMRSs may be based on operating in a DMRS sharing mode or a DMRS bundling mode or both.

At block 1035, the UE 115-*b* may determine one or more parameters of the DMRSs. The one or more parameters may be determined based on a DMRS pattern configuration that indicates a joint configuration for the plurality of DMRSs. Determining the parameters of DMRSs may utilize any of the methods or functions described with reference to FIGS. 2-9. In some cases, the UE 115-*b* may identify a prioritization criteria (sometimes included in the DMRS pattern configuration) that indicates which parameters to use in a joint configuration of DMRSs. In some cases, the prioritization criteria may indicate parameters for a particular DMRS that the other DMRSs may also use (e.g., first-in-time DMRS or specific-type of DMRS). In some cases, the UE 115-*b* may determine a sequence of DMRS configurations that is independent from any of the individually configured parameters of the individual DMRSs. In such cases, the UE 115-*b* may adjust all of the parameters of all of the DMRSs to comply with the sequence of configurations. In some cases, the sequence of configurations may be used if DMRS sharing and DMRS bundling is not enabled.

In some cases, the DMRS pattern configuration may indicate that a certain DMRS should include various features of a different DMRS to enabled DMRS sharing or bundling. For example, if a first DMRS includes a first port associated with its data channel and a second DMRS includes a second port, different from the first port, associated with its data channel, the UE 115-*b* may cause at least one of the DMRSs to include both ports so that DMRS sharing or DMRS bundling may be implemented for at least one data channel.

In some cases, the UE 115-*b* may modify one or more DMRSs of a jointly configured plurality of DMRSs. The one or more DMRSs that are modified may represent an exception to the configuration indicated in a DMRS pattern configuration. The UE 115-*b* may initiate an exception to the DMRS pattern configuration based on channel conditions associated with a data channel (e.g., a NACK received).

The UE 115-*b* may transmit one or more DMRSs 1040 based at least in part on the DMRS pattern configuration or any of the other factors described herein. The UE 115-*b* may set one or more parameters of the DMRSs 1040 based on the DMRS pattern configuration, DMRS sharing being enabled, DMRS bundling being enabled, or a combination thereof. In some cases, the base station 105-*b* may optionally transmit an ACK/NACK 1045 indicating whether the DMRS 1040 and/or its associated data channel were successfully decoded. If a NACK is received, at block 1050, the UE 115-*b* may optionally modify the parameters of a DMRS associated with the retransmission of the failed data channel to increase a likelihood that the data channel is successfully decoded.

Figure 11:
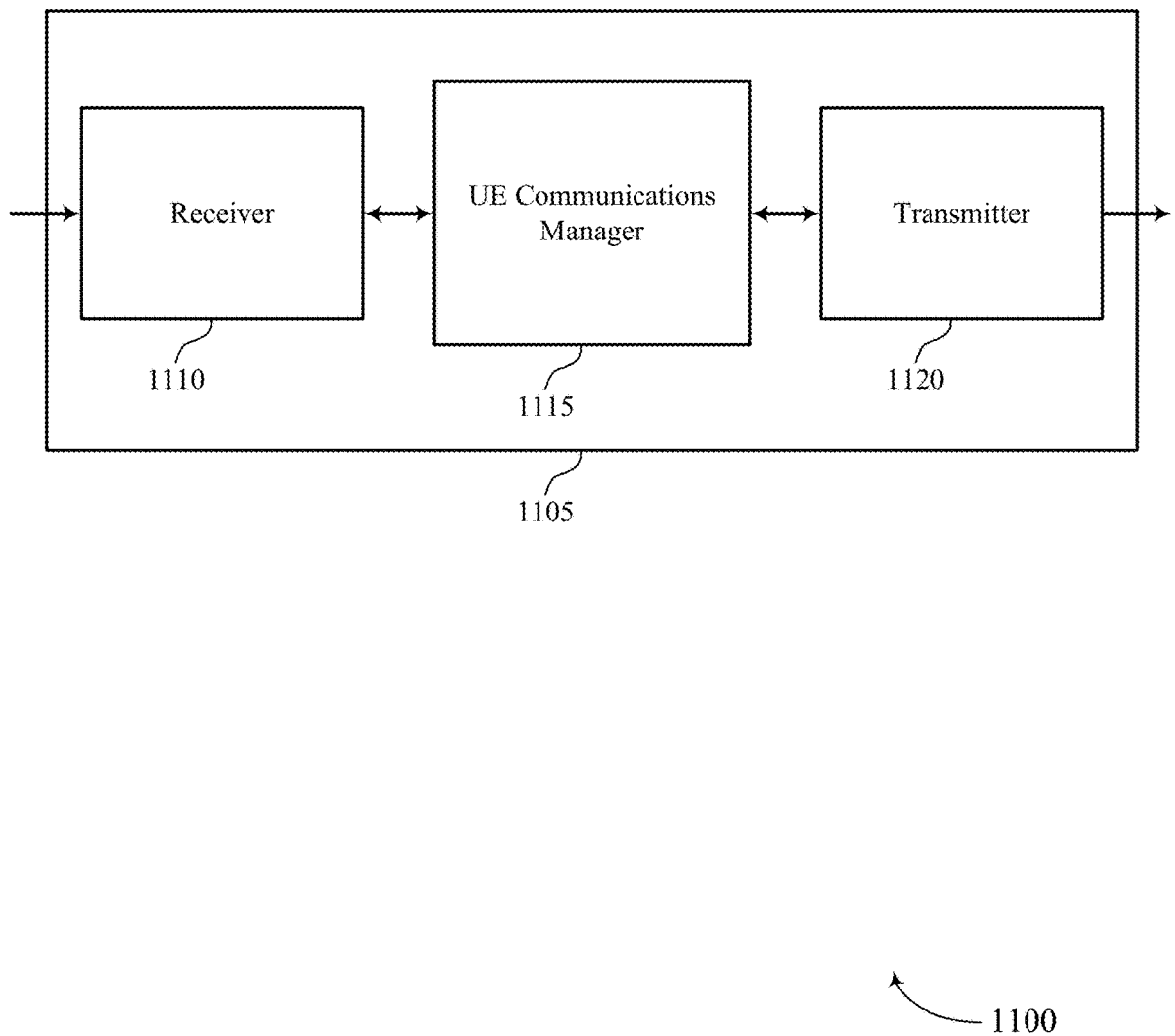
FIGS. 11 through 13 show block diagrams of a device that supports techniques to jointly configure demodulation reference signals in accordance with aspects of the present disclosure.

FIG. 11 shows a block diagram 1100 of a wireless device 1105 that supports techniques to jointly configure demodulation reference signals in accordance with aspects of the present disclosure. Wireless device 1105 may be an example of aspects of a UE 115 as described herein. Wireless device 1105 may include receiver 1110, UE communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to techniques to jointly configure demodulation reference signals, etc.). Information may be passed on to other components of the device. The receiver 1110 may be an example of aspects of the transceiver 1435 described with reference to FIG. 14. The receiver 1110 may utilize a single antenna or a set of antennas.

UE communications manager 1115 may be an example of aspects of the UE communications manager 1415 described with reference to FIG. 14. UE communications manager 1115 and/or at least some of its various sub-components may be implemented in hardware, software executed by a processor, firmware, or any combination thereof. If implemented in software executed by a processor, the functions of the UE communications manager 1115 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 1115 and/or at least some of its various sub-components may be physically located at various positions, including being distributed such that portions of functions are implemented at different physical locations by one or more physical devices. In some examples, UE communications manager 1115 and/or at least some of its various sub-components may be a separate and distinct component in accordance with various aspects of the present disclosure. In other examples, UE communications manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 1115 may receive a set of grants of communication resources scheduling a set of data channels and a set of DMRSs, each data channel including one or more DMRSs of the set of DMRSs, determine a parameter of each DMRS based on a DMRS pattern configuration, the DMRS pattern configuration indicating that the parameter of at least one DMRS is associated with the parameter of at least one other DMRS, and transmit the set of DMRSs based on the parameters determined using the DMRS pattern configuration.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
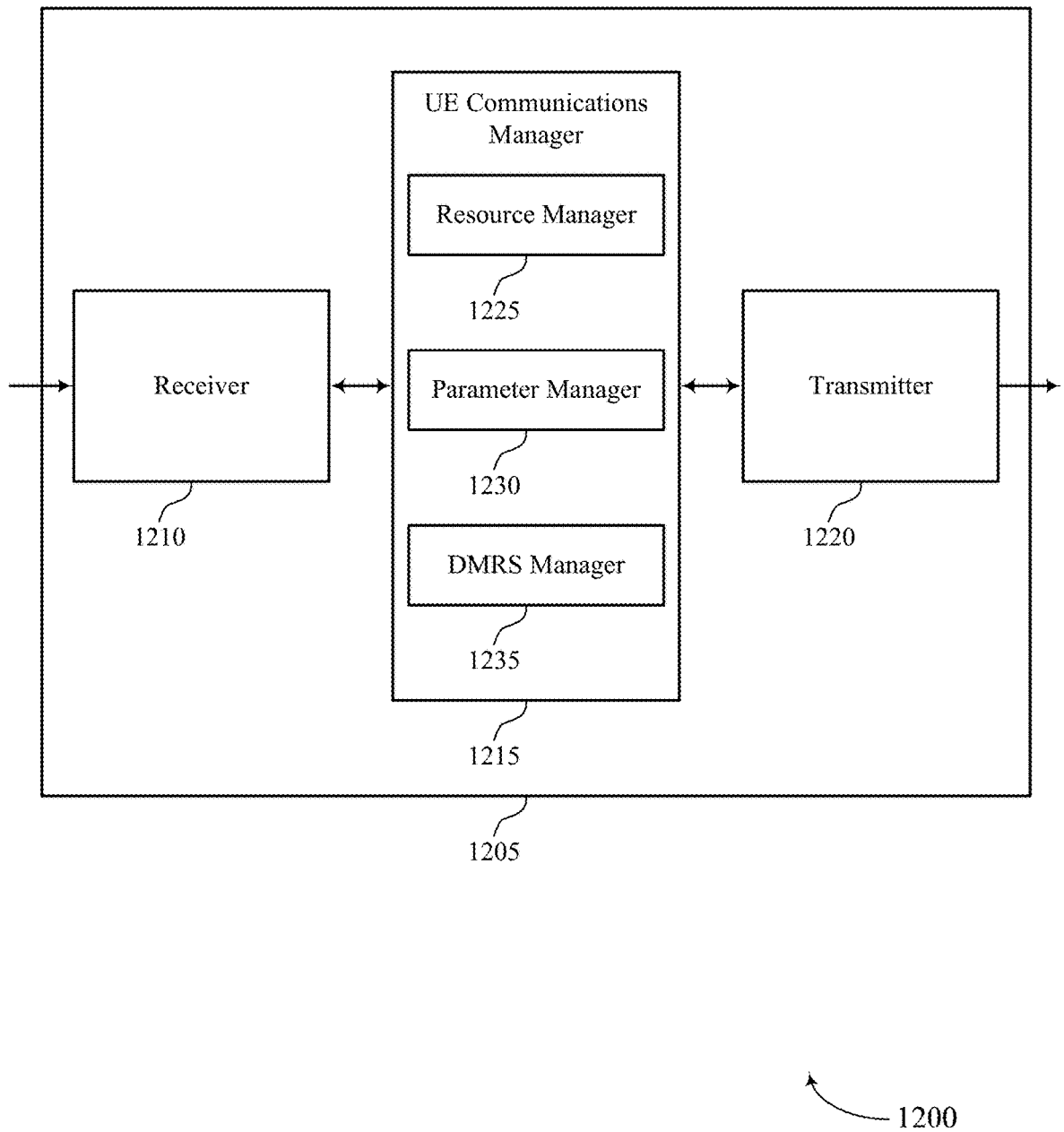

FIG. 12 shows a block diagram 1200 of a wireless device 1205 that supports techniques to jointly configure demodulation reference signals in accordance with aspects of the present disclosure. Wireless device 1205 may be an example of aspects of a wireless device 1105 or a UE 115 as described with reference to FIG. 11. Wireless device 1205 may include receiver 1210, UE communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to techniques to jointly configure demodulation reference signals, etc.). Information may be passed on to other components of the device. The receiver 1210 may be an example of aspects of the transceiver 1435 described with reference to FIG. 14. The receiver 1210 may utilize a single antenna or a set of antennas.

UE communications manager 1215 may be an example of aspects of the UE communications manager 1415 described with reference to FIG. 14. UE communications manager 1215 may also include resource manager 1225, parameter manager 1230, and DMRS manager 1235.

Resource manager 1225 may receive at least one grant of communication resources that schedules a set of data channels and a set of DMRSs, each data channel including one or more DMRSs of the set of DMRSs.

Parameter manager 1230 may determine a parameter of each DMRS based on a DMRS pattern configuration, the DMRS pattern configuration indicating that the parameter of at least one DMRS is associated with the parameter of at least one other DMRS. In some cases, the parameter is a maximum number of DMRSs, a configuration type of a DMRS, a scrambling identifier of the DMRS, a DMRS location, a number of additional DMRS locations based on a length of a channel associated with the set of DMRSs, or a combination thereof.

DMRS manager 1235 may transmit the set of DMRSs based on the parameters determined using the DMRS pattern configuration, determine that DMRS sharing between a first channel of a first mapping type and a second channel of a second mapping type is enabled, identify a first port associated with a first DMRS of the first channel and a second port associated with a second DMRS of the second channel, the second port being different from the first port, transmit the first DMRS using the first port and the second DMRS using the first port and the second port, where the second port is code division multiplexed with the first port in the second DMRS, identify a first set of ports associated with a first DMRS of the first channel and a second set of ports associated with a second DMRS of the second channel, the second set of ports being complementary ports to the first set of ports, and transmit the first DMRS using the first set of ports and the second DMRS using the first set of ports and the second set of ports.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
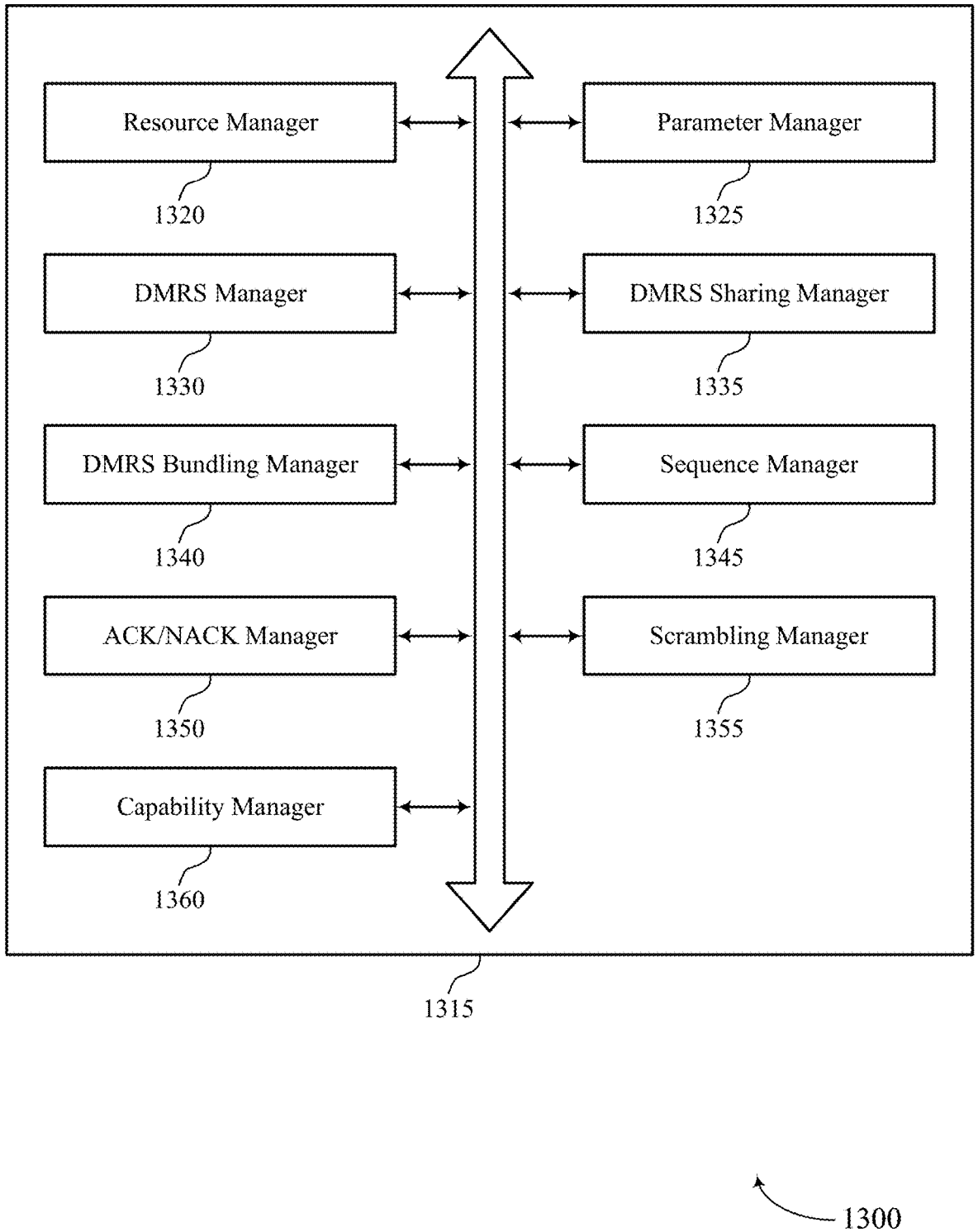

FIG. 13 shows a block diagram 1300 of a UE communications manager 1315 that supports techniques to jointly configure demodulation reference signals in accordance with aspects of the present disclosure. The UE communications manager 1315 may be an example of aspects of a UE communications manager 1115, a UE communications manager 1215, or a UE communications manager 1415 described with reference to FIGS. 11, 12, and 14. The UE communications manager 1315 may include resource manager 1320, parameter manager 1325, DMRS manager 1330, DMRS sharing manager 1335, DMRS bundling manager 1340, sequence manager 1345, ACK/NACK manager 1350, scrambling manager 1355, and capability manager 1360. Each of these modules may communicate, directly or indirectly, with one another (e.g., via one or more buses).

Resource manager 1320 may receive at least one grant of communication resources that schedules a set of data channels and a set of DMRSs, each data channel including one or more DMRSs of the set of DMRSs.

Parameter manager 1325 may determine a parameter of each DMRS based on a DMRS pattern configuration, the DMRS pattern configuration indicating that the parameter of at least one DMRS is associated with the parameter of at least one other DMRS. In some cases, the parameter is a maximum number of DMRSs, a configuration type of a DMRS, a scrambling identifier of the DMRS, a DMRS location, a number of additional DMRS locations based on a length of a channel associated with the set of DMRSs, or a combination thereof.

DMRS manager 1330 may transmit the set of DMRSs based on the parameters determined using the DMRS pattern configuration, determine that DMRS sharing between a first channel of a first mapping type and a second channel of a second mapping type is enabled, identify a first port associated with a first DMRS of the first channel and a second port associated with a second DMRS of the second channel, the second port being different from the first port, transmit the first DMRS using the first port and the second DMRS using the first port and the second port, where the second port is code division multiplexed with the first port in the second DMRS, identify a first set of ports associated with a first DMRS of the first channel and a second set of ports associated with a second DMRS of the second channel, the second set of ports being complementary ports to the first set of ports, and transmit the first DMRS using the first set of ports and the second DMRS using the first set of ports and the second set of ports.

DMRS sharing manager 1335 may determine that DMRS sharing between channels of different mapping types associated with the set of DMRSs is enabled, where determining the parameter is based on determining that the DMRS sharing is enabled, identify a prioritization criteria based on determining that the DMRS sharing is enabled, and determine that a value of the parameter of each DMRS is the same based at least in part the prioritization criteria. In some cases, the prioritization criteria indicates that the parameter is based on a configuration of a first-in-time DMRS of the set of DMRSs or the parameter is based on a configuration of a specific-type of DMRS of the set of DMRSs.

DMRS bundling manager 1340 may determine that DMRS bundling between the DMRSs of data channels transmitted across different slots is enabled, where determining the parameter is based on determining that the DMRS bundling is enabled, identify a prioritization criteria based on determining that the DMRS bundling is enabled, and determine that the parameter of each DMRS is the same based at least in part the prioritization criteria. In some cases, the prioritization criteria indicates that the parameter is based on a configuration of a first-in-time DMRS of the set of DMRSs or the parameter is based on a configuration of a specific-type of DMRS of the set of DMRSs.

Sequence manager 1345 may identify a sequence of DMRS configuration for the set of DMRSs based on the at least one grant of communication resources including more than one DMRS, where determining the parameter for each DMRS is based on identifying the sequence of DMRS configuration and determine that DMRS sharing and DMRS bundling is not enabled for the set of DMRSs in the at least one grant of communication resources, where identifying the sequence of DMRS configuration is based on determining that the DMRS sharing and the DMRS bundling is not enabled.

ACK/NACK manager 1350 may receive a NACK that a data channel transmitted with a first DMRS having a first configuration was not successfully decoded by a base station and identify a second configuration for a second DMRS included in a re-transmitted data channel based on receiving the NACK.

Scrambling manager 1355 may determine that DMRS sharing between channels of different mapping types associated with the set of DMRSs is enabled or that DMRS bundling between different slots is enabled and determine one or more scrambling identifiers used for pseudo-random sequence initializing for the set of DMRSs based on determining that the DMRS sharing or the DMRS bundling is enabled, where determining the parameter is based on determining the one or more scrambling identifiers.

Capability manager 1360 may identify a capability of a UE to have different DMRS configuration types across channels with different mapping types, enable DMRS sharing or DMRS bundling based on identifying the capability of the UE, where determining the parameter is based on enabling the DMRS sharing or the DMRS bundling, and transmit a message to a base station including the capability of the UE.

Figure 14:
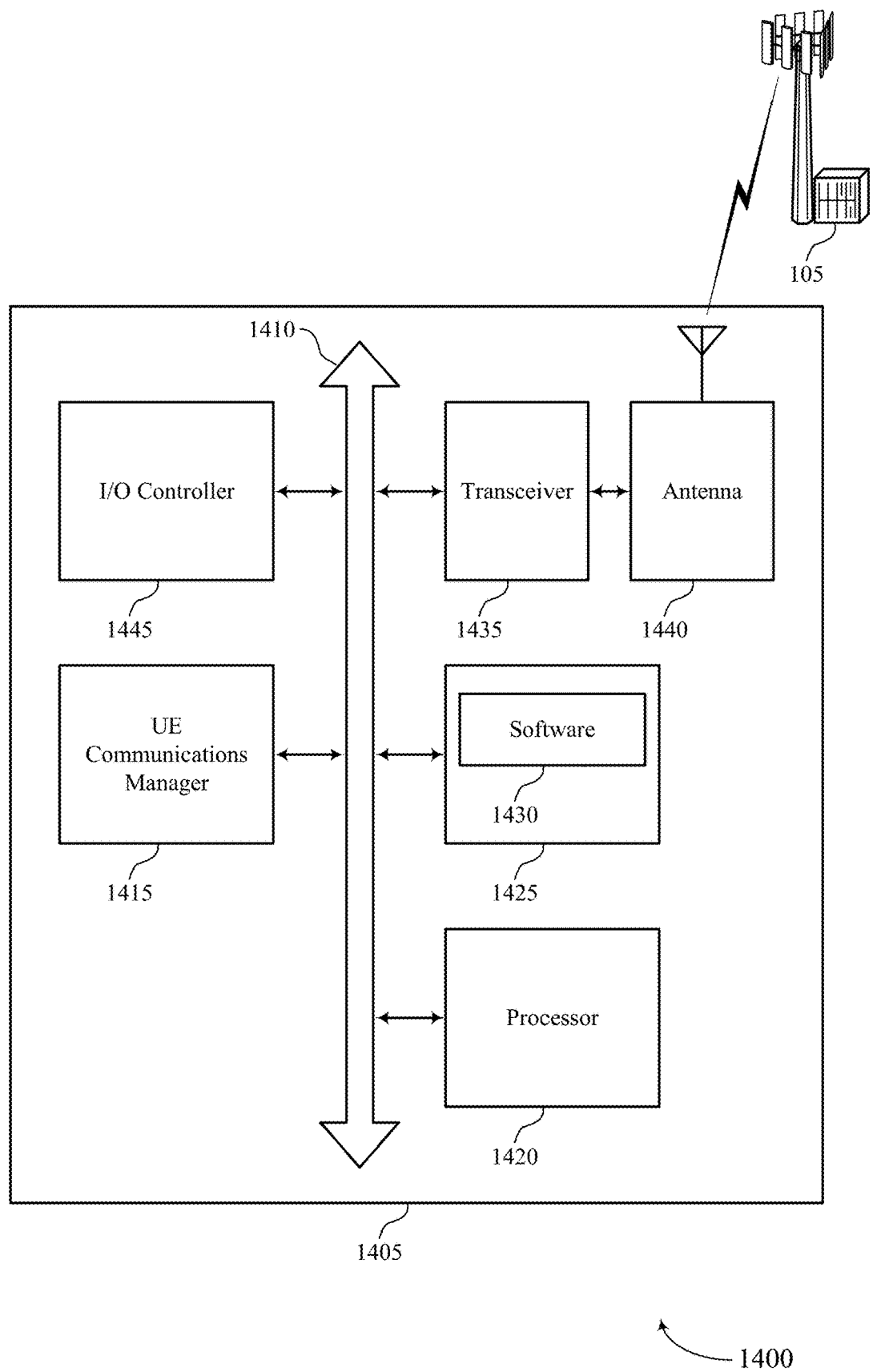
FIG. 14 illustrates a block diagram of a system including a UE that supports techniques to jointly configure demodulation reference signals in accordance with aspects of the present disclosure.

FIG. 14 shows a diagram of a system 1400 including a device 1405 that supports techniques to jointly configure demodulation reference signals in accordance with aspects of the present disclosure. Device 1405 may be an example of or include the components of wireless device 1105, wireless device 1205, or a UE 115 as described above, e.g., with reference to FIGS. 11 and 12. Device 1405 may include components for bi-directional voice and data communications including components for transmitting and receiving communications, including UE communications manager 1415, processor 1420, memory 1425, software 1430, transceiver 1435, antenna 1440, and I/O controller 1445. These components may be in electronic communication via one or more buses (e.g., bus 1410). Device 1405 may communicate wirelessly with one or more base stations 105.

Processor 1420 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting techniques to jointly configure demodulation reference signals).

Memory 1425 may include random access memory (RAM) and read only memory (ROM). The memory 1425 may store computer-readable, computer-executable software 1430 including instructions that, when executed, cause the processor to perform various functions described herein. In some cases, the memory 1425 may contain, among other things, a basic input/output system (BIOS) which may control basic hardware or software operation such as the interaction with peripheral components or devices.

Software 1430 may include code to implement aspects of the present disclosure, including code to support techniques to jointly configure demodulation reference signals. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

I/O controller 1445 may manage input and output signals for device 1405. I/O controller 1445 may also manage peripherals not integrated into device 1405. In some cases, I/O controller 1445 may represent a physical connection or port to an external peripheral. In some cases, I/O controller 1445 may utilize an operating system such as iOS®, ANDROID®, MS-DOS®, MS-WINDOWS®, OS/2®, UNIX®, LINUX®, or another known operating system. In other cases, I/O controller 1445 may represent or interact with a modem, a keyboard, a mouse, a touchscreen, or a similar device. In some cases, I/O controller 1445 may be implemented as part of a processor. In some cases, a user may interact with device 1405 via I/O controller 1445 or via hardware components controlled by I/O controller 1445.

Figure 15:
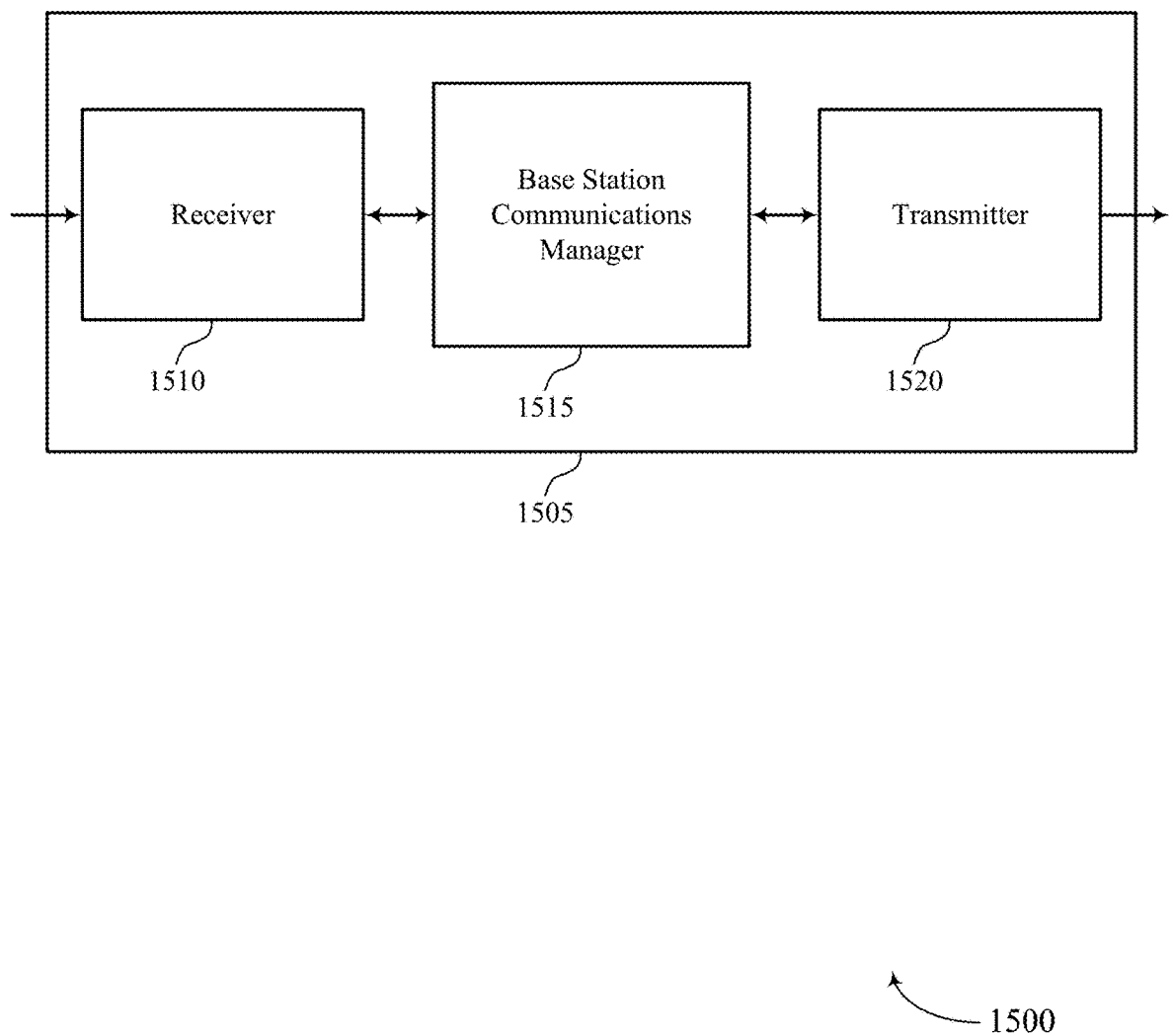
FIGS. 15 through 17 show block diagrams of a device that supports techniques to jointly configure demodulation reference signals in accordance with aspects of the present disclosure.

FIG. 15 shows a block diagram 1500 of a wireless device 1505 that supports techniques to jointly configure demodulation reference signals in accordance with aspects of the present disclosure. Wireless device 1505 may be an example of aspects of a base station 105 as described herein. Wireless device 1505 may include receiver 1510, base station communications manager 1515, and transmitter 1520. Wireless device 1505 may also include a processor. Each of these components may be in communication with one another (e.g., via one or more buses).

Receiver 1510 may receive information such as packets, user data, or control information associated with various information channels (e.g., control channels, data channels, and information related to techniques to jointly configure demodulation reference signals, etc.). Information may be passed on to other components of the device. The receiver 1510 may be an example of aspects of the transceiver 1835 described with reference to FIG. 18. The receiver 1510 may utilize a single antenna or a set of antennas.

Base station communications manager 1515 may be an example of aspects of the base station communications manager 1815 described with reference to FIG. 18. Base station communications manager 1515 and/or at least some of its various sub-components may be implemented in hardware, software executed by a processor, firmware, or any combination thereof. If implemented in software executed by a processor, the functions of the base station communications manager 1515 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1515 and/or at least some of its various sub-components may be physically located at various positions, including being distributed such that portions of functions are implemented at different physical locations by one or more physical devices. In some examples, base station communications manager 1515 and/or at least some of its various sub-components may be a separate and distinct component in accordance with various aspects of the present disclosure. In other examples, base station communications manager 1515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1515 may allocate resources to a set of data channels associated with a UE and set of DMRSs, each data channel including one or more DMRSs of the set of DMRSs, identify a DMRS pattern configuration for the set of DMRSs, and transmit a set of grants of communication resources that includes the set of DMRSs and the DMRS pattern configuration.

Transmitter 1520 may transmit signals generated by other components of the device. In some examples, the transmitter 1520 may be collocated with a receiver 1510 in a transceiver module. For example, the transmitter 1520 may be an example of aspects of the transceiver 1835 described with reference to FIG. 18. The transmitter 1520 may utilize a single antenna or a set of antennas.

Figure 16:
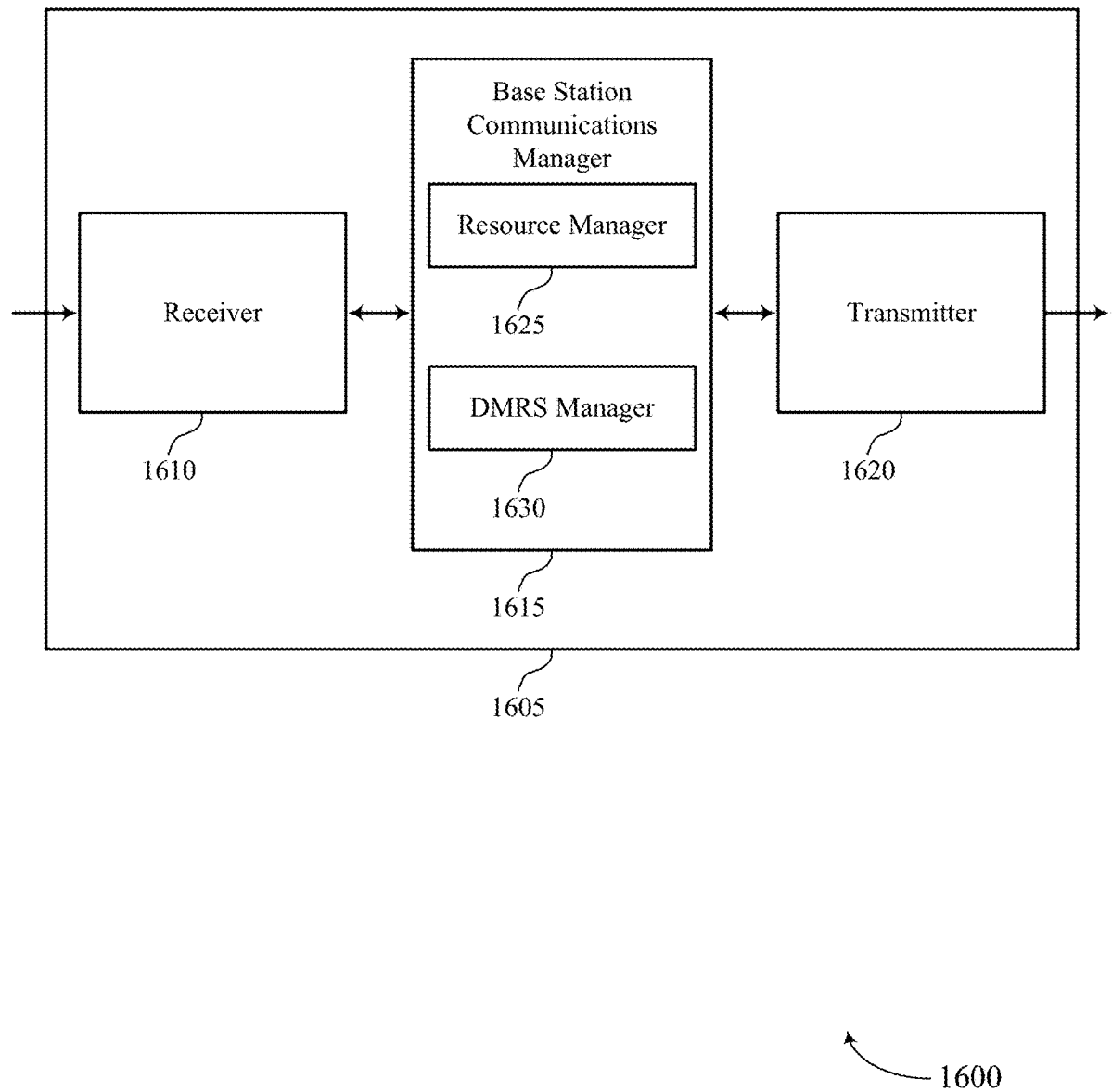

FIG. 16 shows a block diagram 1600 of a wireless device 1605 that supports techniques to jointly configure demodulation reference signals in accordance with aspects of the present disclosure. Wireless device 1605 may be an example of aspects of a wireless device 1505 or a base station 105 as described with reference to FIG. 15. Wireless device 1605 may include receiver 1610, base station communications manager 1615, and transmitter 1620. Wireless device 1605 may also include a processor. Each of these components may be in communication with one another (e.g., via one or more buses).

Receiver 1610 may receive information such as packets, user data, or control information associated with various information channels (e.g., control channels, data channels, and information related to techniques to jointly configure demodulation reference signals, etc.). Information may be passed on to other components of the device. The receiver 1610 may be an example of aspects of the transceiver 1835 described with reference to FIG. 18. The receiver 1610 may utilize a single antenna or a set of antennas.

Base station communications manager 1615 may be an example of aspects of the base station communications manager 1815 described with reference to FIG. 18. Base station communications manager 1615 may also include resource manager 1625 and DMRS manager 1630.

Resource manager 1625 may allocate resources to a set of data channels associated with a UE and set of DMRSs, each data channel including one or more DMRSs of the set of DMRSs and transmit at least one grant of communication resources that includes the set of DMRSs and the DMRS pattern configuration.

DMRS manager 1630 may identify a DMRS pattern configuration for the set of DMRSs. In some cases, the DMRS pattern configuration indicates a parameter of each of the set of the DMRSs is the same. In some cases, the DMRS pattern configuration indicates a parameter of each of the set of the DMRSs is independently configured. In some cases, the DMRS pattern configuration indicates that DMRS sharing is enabled. In some cases, the DMRS pattern configuration indicates that DMRS bundling is enabled.

Transmitter 1620 may transmit signals generated by other components of the device. In some examples, the transmitter 1620 may be collocated with a receiver 1610 in a transceiver module. For example, the transmitter 1620 may be an example of aspects of the transceiver 1835 described with reference to FIG. 18. The transmitter 1620 may utilize a single antenna or a set of antennas.

Figure 17:
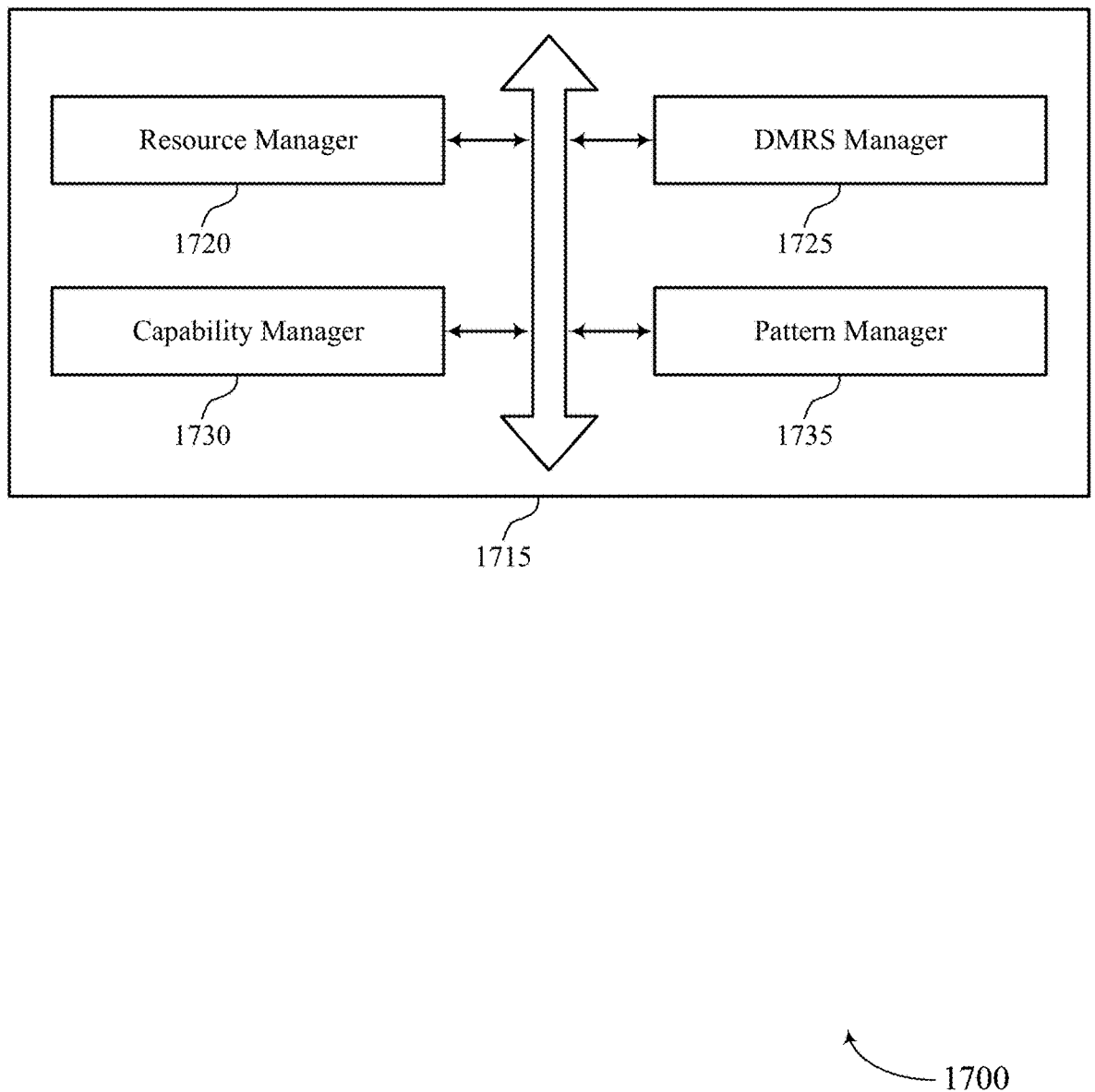

FIG. 17 shows a block diagram 1700 of a base station communications manager 1715 that supports techniques to jointly configure demodulation reference signals in accordance with aspects of the present disclosure. The base station communications manager 1715 may be an example of aspects of a base station communications manager 1815 described with reference to FIGS. 15, 16, and 18. The base station communications manager 1715 may include resource manager 1720, DMRS manager 1725, capability manager 1730, and pattern manager 1735. Each of these modules may communicate, directly or indirectly, with one another (e.g., via one or more buses).

Resource manager 1720 may allocate resources to a set of data channels associated with a UE and set of DMRSs, each data channel including one or more DMRSs of the set of DMRSs and transmit at least one grant of communication resources that includes the set of DMRSs and the DMRS pattern configuration.

DMRS manager 1725 may identify a DMRS pattern configuration for the set of DMRSs. In some cases, the DMRS pattern configuration indicates a parameter of each of the set of the DMRSs is the same. In some cases, the DMRS pattern configuration indicates a parameter of each of the set of the DMRSs is independently configured. In some cases, the DMRS pattern configuration indicates that DMRS sharing is enabled. In some cases, the DMRS pattern configuration indicates that DMRS bundling is enabled.

Capability manager 1730 may receive a message indicating a capability of the UE to have different DMRS configuration types across channels with different mapping types, where identifying the DMRS pattern configuration is based on receiving the message.

Pattern manager 1735 may receive a DMRS that includes at least one parameter configured according to the DMRS pattern configuration based on transmitting the set of grants of communication resources.

Figure 18:
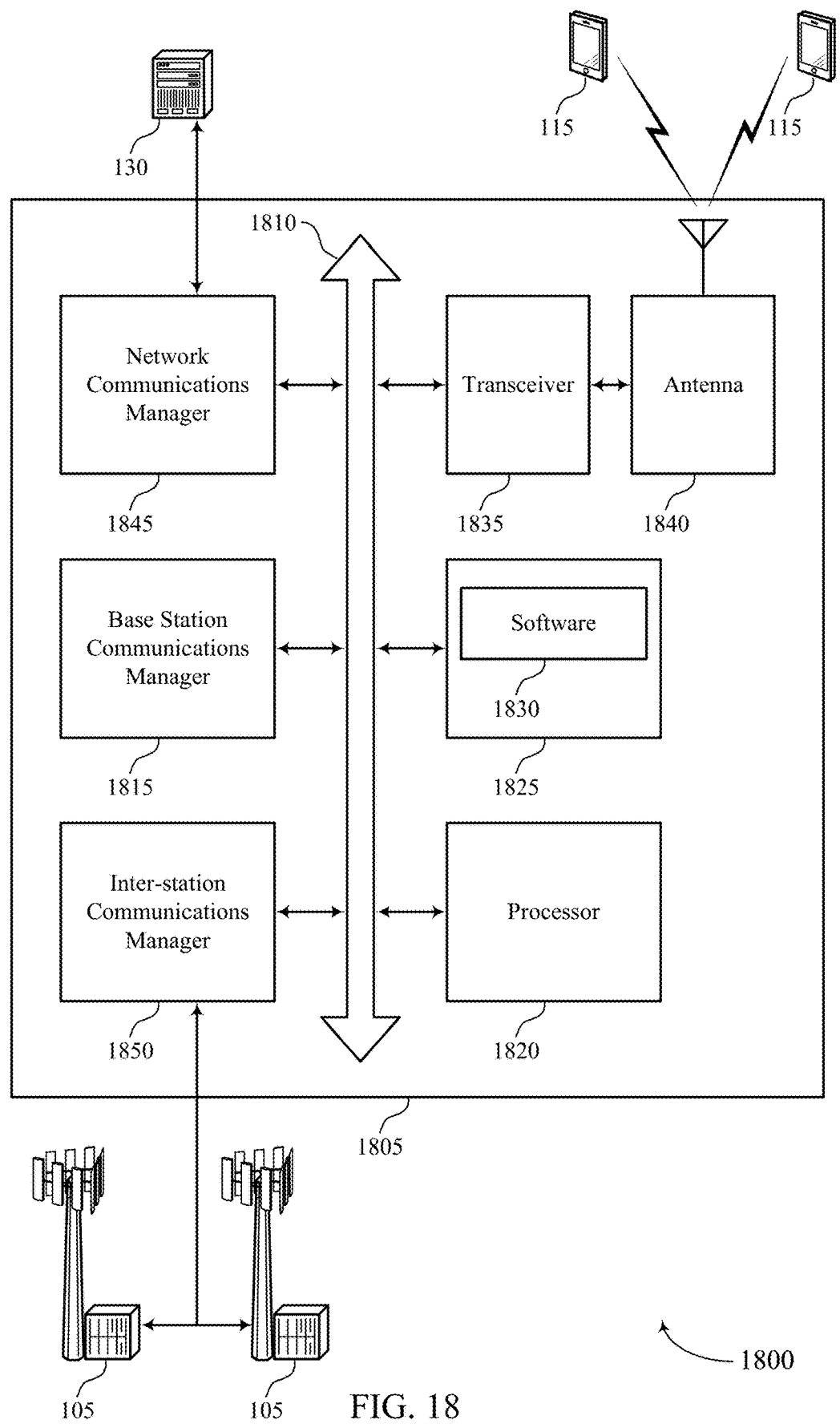
FIG. 18 illustrates a block diagram of a system including a base station that supports techniques to jointly configure demodulation reference signals in accordance with aspects of the present disclosure.

FIG. 18 shows a diagram of a system 1800 including a device 1805 that supports techniques to jointly configure demodulation reference signals in accordance with aspects of the present disclosure. Device 1805 may be an example of or include the components of base station 105 as described above, e.g., with reference to FIG. 1. Device 1805 may include components for bi-directional voice and data communications including components for transmitting and receiving communications, including base station communications manager 1815, processor 1820, memory 1825, software 1830, transceiver 1835, antenna 1840, network communications manager 1845, and inter-station communications manager 1850. These components may be in electronic communication via one or more buses (e.g., bus 1810). Device 1805 may communicate wirelessly with one or more UEs 115.

Processor 1820 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1820 may be configured to operate a memory array using a memory controller. In other cases, a memory controller may be integrated into processor 1820. Processor 1820 may be configured to execute computer-readable instructions stored in a memory to perform various functions (e.g., functions or tasks supporting techniques to jointly configure demodulation reference signals).

Memory 1825 may include RAM and ROM. The memory 1825 may store computer-readable, computer-executable software 1830 including instructions that, when executed, cause the processor to perform various functions described herein. In some cases, the memory 1825 may contain, among other things, a BIOS which may control basic hardware or software operation such as the interaction with peripheral components or devices.

Software 1830 may include code to implement aspects of the present disclosure, including code to support techniques to jointly configure demodulation reference signals. Software 1830 may be stored in a non-transitory computer-readable medium such as system memory or other memory. In some cases, the software 1830 may not be directly executable by the processor but may cause a computer (e.g., when compiled and executed) to perform functions described herein.

Transceiver 1835 may communicate bi-directionally, via one or more antennas, wired, or wireless links as described above. For example, the transceiver 1835 may represent a wireless transceiver and may communicate bi-directionally with another wireless transceiver. The transceiver 1835 may also include a modem to modulate the packets and provide the modulated packets to the antennas for transmission, and to demodulate packets received from the antennas.

In some cases, the wireless device may include a single antenna 1840. However, in some cases the device may have more than one antenna 1840, which may be capable of concurrently transmitting or receiving multiple wireless transmissions.

Network communications manager 1845 may manage communications with the core network (e.g., via one or more wired backhaul links). For example, the network communications manager 1845 may manage the transfer of data communications for client devices, such as one or more UEs 115.

Inter-station communications manager 1850 may manage communications with other base station 105, and may include a controller or scheduler for controlling communications with UEs 115 in cooperation with other base stations 105. For example, the inter-station communications manager 1850 may coordinate scheduling for transmissions to UEs 115 for various interference mitigation techniques such as beamforming or joint transmission. In some examples, inter-station communications manager 1850 may provide an X2 interface within a Long Term Evolution (LTE)/LTE-A wireless communication network technology to provide communication between base stations 105.

Figure 19:
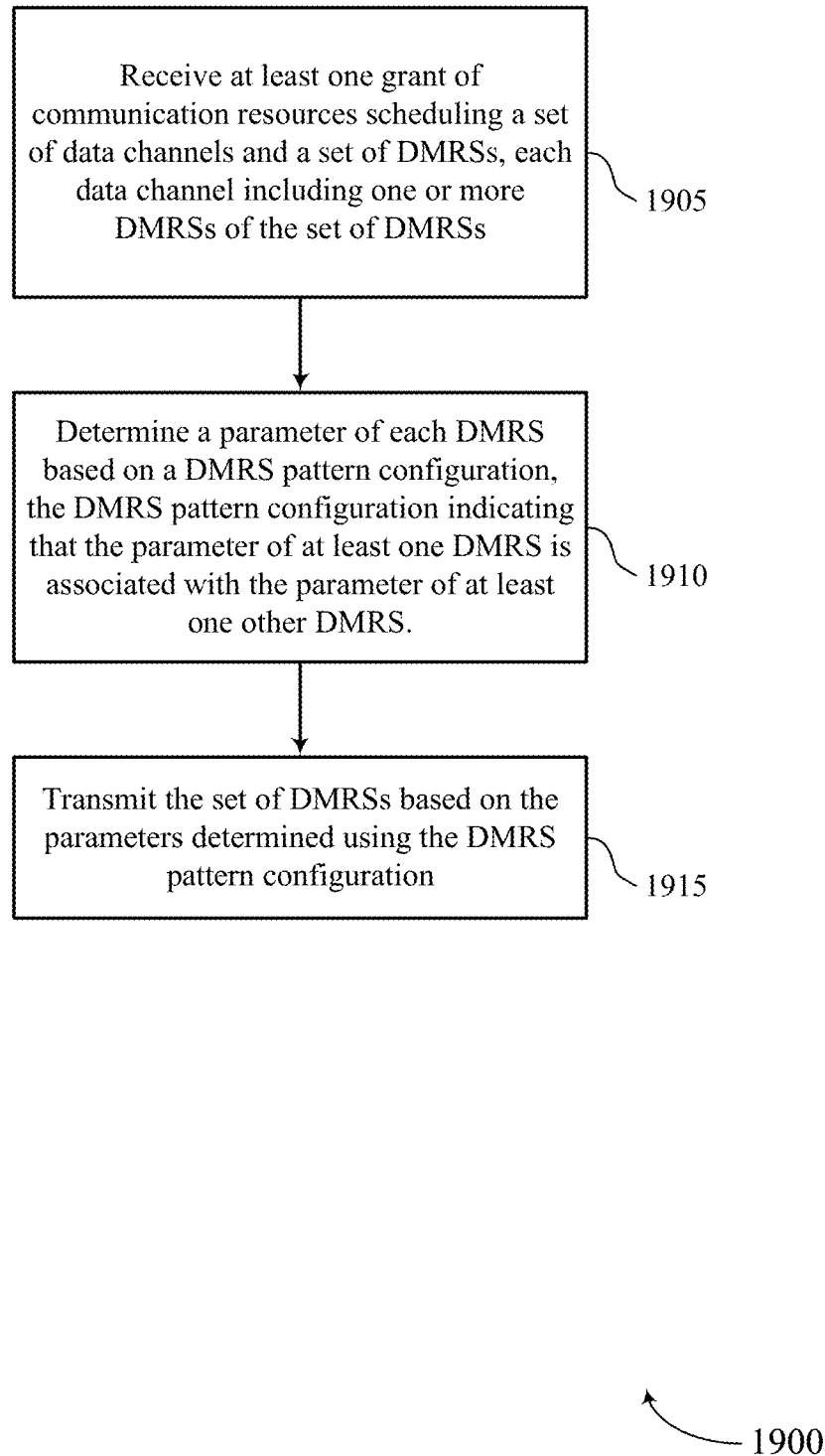
FIGS. 19 through 20 illustrate methods for techniques to jointly configure demodulation reference signals in accordance with aspects of the present disclosure.

FIG. 19 shows a flowchart illustrating a method 1900 for techniques to jointly configure demodulation reference signals in accordance with aspects of the present disclosure. The operations of method 1900 may be implemented by a UE 115 or its components as described herein. For example, the operations of method 1900 may be performed by a UE communications manager as described with reference to FIGS. 11 through 14. In some examples, a UE 115 may execute a set of codes to control the functional elements of the device to perform the functions described below. Additionally or alternatively, the UE 115 may perform aspects of the functions described below using special-purpose hardware.

At 1905 the UE 115 may receive at least one grant of communication resources scheduling a plurality of data channels and a plurality of DMRSs, each data channel including one or more DMRSs of the plurality of DMRSs. The operations of 1905 may be performed according to the methods described herein. In certain examples, aspects of the operations of 1905 may be performed by a resource manager as described with reference to FIGS. 11 through 14.

At 1910 the UE 115 may determine a parameter of each DMRS based at least in part on a DMRS pattern configuration, the DMRS pattern configuration indicating that the parameter of at least one DMRS is associated with the parameter of at least one other DMRS. The operations of 1910 may be performed according to the methods described herein. In certain examples, aspects of the operations of 1910 may be performed by a parameter manager as described with reference to FIGS. 11 through 14.

At 1915 the UE 115 may transmit the plurality of DMRSs based at least in part on the parameters determined using the DMRS pattern configuration. The operations of 1915 may be performed according to the methods described herein. In certain examples, aspects of the operations of 1915 may be performed by a DMRS manager as described with reference to FIGS. 11 through 14.

Figure 20:
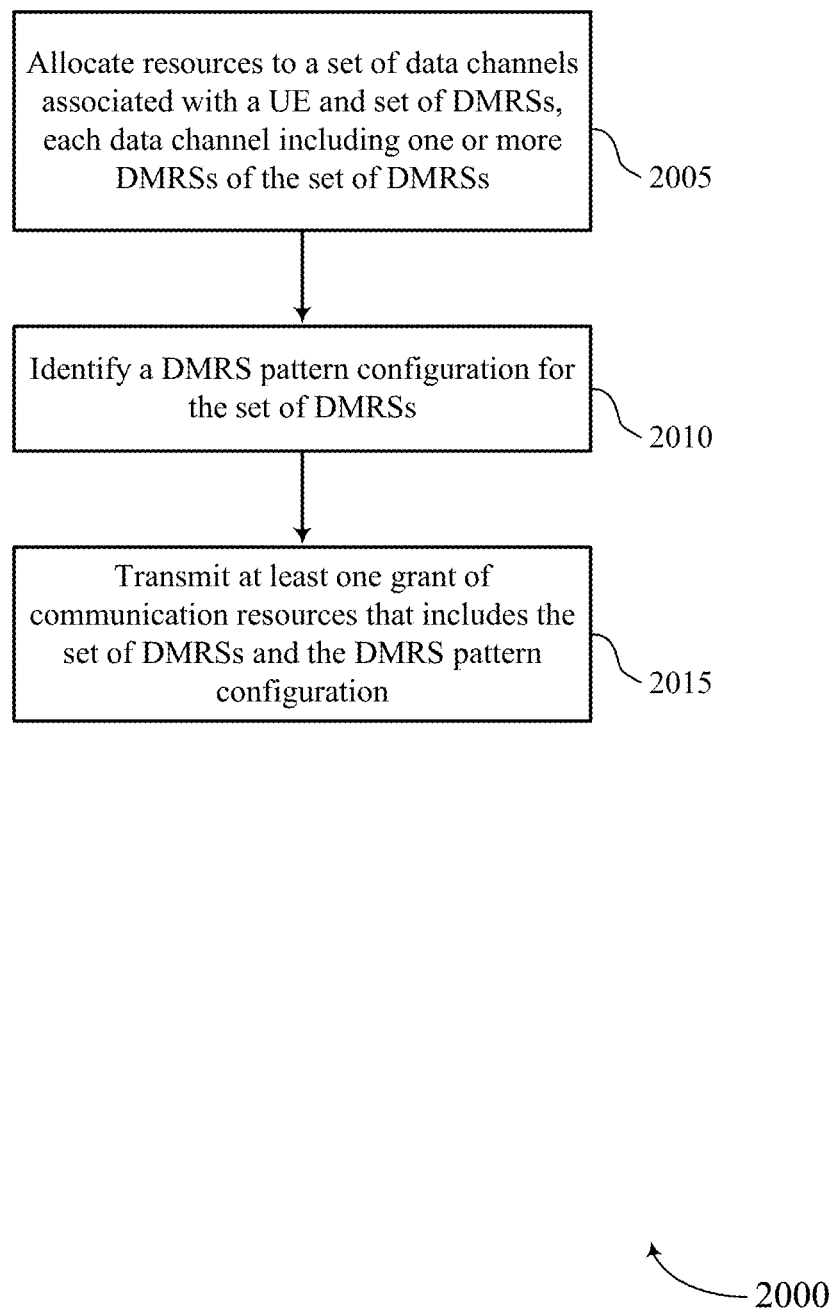

FIG. 20 shows a flowchart illustrating a method 2000 for techniques to jointly configure demodulation reference signals in accordance with aspects of the present disclosure. The operations of method 2000 may be implemented by a base station 105 or its components as described herein. For example, the operations of method 2000 may be performed by a base station communications manager as described with reference to FIGS. 15 through 18. In some examples, a base station 105 may execute a set of codes to control the functional elements of the device to perform the functions described below. Additionally or alternatively, the base station 105 may perform aspects of the functions described below using special-purpose hardware.

At 2005 the base station 105 may allocate resources to a plurality of data channels associated with a UE and plurality of DMRSs, each data channel including one or more DMRSs of the plurality of DMRSs. The operations of 2005 may be performed according to the methods described herein. In certain examples, aspects of the operations of 2005 may be performed by a resource manager as described with reference to FIGS. 15 through 18.

At 2010 the base station 105 may identify a DMRS pattern configuration for the plurality of DMRSs. The operations of 2010 may be performed according to the methods described herein. In certain examples, aspects of the operations of 2010 may be performed by a DMRS manager as described with reference to FIGS. 15 through 18.

At 2015 the base station 105 may transmit at least one grant of communication resources that includes the plurality of DMRSs and the DMRS pattern configuration. The operations of 2015 may be performed according to the methods described herein. In certain examples, aspects of the operations of 2015 may be performed by a resource manager as described with reference to FIGS. 15 through 18.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving at least one grant of communication resources that schedules a plurality of data channels and a plurality of demodulation reference signals (DMRSs), each data channel including one or more DMRSs of the plurality of DMRSs, wherein the plurality of data channels includes at least a first data channel having a first mapping type and a second data channel having a second mapping type;
   determining that DMRS sharing between channels of different mapping types associated with the plurality of DMRSs is used;
   determining a parameter of each DMRS based at least in part on a DMRS pattern configuration, the DMRS pattern configuration indicating that a first parameter of at least one DMRS of the first data channel is associated with a second parameter of at least one other DMRS of the second data channel based at least in part on determining that the DMRS sharing is used; and
   communicating the plurality of DMRSs based at least in part on determining the parameter of each DMRS using the DMRS pattern configuration.

2. The method of claim 1, further comprising:
   identifying a prioritization criteria based at least in part on determining that the DMRS sharing is used; and
   determining that a value of the parameter of each DMRS is the same based at least in part on the prioritization criteria.

3. The method of claim 2, wherein the prioritization criteria indicates that the parameter of each DMRS is based on a configuration of a first-in-time DMRS of the plurality of DMRSs or the parameter of each DMRS is based on a configuration of a specific-type of DMRS of the plurality of DMRSs.

4. The method of claim 1, further comprising:
   determining that DMRS bundling between the DMRSs of data channels transmitted across different slots is used, wherein determining the parameter of each DMRS is based at least in part on determining that the DMRS bundling is used.

5. The method of claim 4, further comprising:
   identifying a prioritization criteria based at least in part on determining that the DMRS bundling is used; and
   determining that the parameter of each DMRS is the same based at least in part on the prioritization criteria.

6. The method of claim 5, wherein the prioritization criteria indicates that the parameter of each DMRS is based on a configuration of a first-in-time DMRS of the plurality of DMRSs or the parameter of each DMRS is based on a configuration of a specific-type of DMRS of the plurality of DMRSs.

7. The method of claim 1, further comprising:
   identifying a sequence of DMRS configuration for the plurality of DMRSs based at least in part on the at least one grant of communication resources including more than one DMRS, wherein determining the parameter of each DMRS is based at least in part on identifying the sequence of DMRS configuration.

8. The method of claim 7, further comprising:
   determining that DMRS sharing and DMRS bundling is not used for the plurality of DMRSs in the at least one grant of communication resources, wherein identifying the sequence of DMRS configuration is based at least in part on determining that the DMRS sharing and the DMRS bundling is not used.

9. The method of claim 1, further comprising:
   determining that DMRS sharing between channels of the different mapping types associated with the plurality of DMRSs is used or that DMRS bundling between different slots is used; and
   determining one or more scrambling identifiers used for pseudo-random sequence initializing for the plurality of DMRSs based at least in part on determining that the DMRS sharing or the DMRS bundling is used, wherein determining the parameter of each DMRS is based at least in part on determining the one or more scrambling identifiers.

10. The method of claim 1, further comprising:
    identifying a capability of a user equipment (UE) to have different DMRS configuration types across channels with the different mapping types; and
    enabling DMRS sharing or DMRS bundling based at least in part on identifying the capability of the UE, wherein determining the parameter of each DMRS is based at least in part on enabling the DMRS sharing or the DMRS bundling.

11. The method of claim 10, further comprising:
    transmitting a message to a base station including the capability of the UE.

12. The method of claim 1, further comprising:
    determining that DMRS sharing between a first channel of a first mapping type and a second channel of a second mapping type is used;
    identifying a first port associated with a first DMRS of the first channel and a second port associated with a second DMRS of the second channel, the second port being different from the first port; and
    communicating the first DMRS using the first port and the second DMRS using the first port and the second port, wherein the second port is code division multiplexed with the first port in the second DMRS.

13. The method of claim 1, further comprising:
    determining that DMRS sharing between a first channel of a first mapping type and a second channel of a second mapping type is used;
    identifying a first set of ports associated with a first DMRS of the first channel and a second set of ports associated with a second DMRS of the second channel, the second set of ports being complementary ports to the first set of ports; and
    communicating the first DMRS using the first set of ports and the second DMRS using the first set of ports and the second set of ports.

14. The method of claim 1, wherein the parameter of each DMRS is a maximum quantity of DMRSs, a configuration type of a DMRS, a scrambling identifier of the DMRS, a DMRS location, a quantity of additional DMRS locations based on a length of a channel associated with the plurality of DMRSs, or a combination thereof.

15. An apparatus for wireless communication, comprising:
a processor;
memory coupled with the processor; and
instructions stored in the memory and executable by the processor to cause the apparatus to:
receive at least one grant of communication resources that schedules a plurality of data channels and a plurality of demodulation reference signals (DMRSs), each data channel including one or more DMRSs of the plurality of DMRSs, wherein the plurality of data channels includes at least a first data channel having a first mapping type and a second data channel having a second mapping type;
determine that DMRS sharing between channels of different mapping types associated with the plurality of DMRSs is used;
determine a parameter of each DMRS based at least in part on a DMRS pattern configuration, the DMRS pattern configuration indicating that a first parameter of at least one DMRS of the first data channel is associated with a second parameter of at least one other DMRS of the second data channel based at least in part on determining that the DMRS sharing is used; and
communicate the plurality of DMRSs based at least in part on determining the parameter of each DMRS using the DMRS pattern configuration.

16. The apparatus of claim 15, wherein the instructions are further executable by the processor to cause the apparatus to:
determine that DMRS bundling between the DMRSs of data channels transmitted across different slots is used, wherein determining the parameter of each DMRS is based at least in part on determining that the DMRS bundling is used.

17. The apparatus of claim 15, wherein the instructions are further executable by the processor to cause the apparatus to:
identify a sequence of DMRS configuration for the plurality of DMRSs based at least in part on the at least one grant of communication resources including more than one DMRS, wherein determining the parameter of each DMRS is based at least in part on identifying the sequence of DMRS configuration; and
determine that DMRS sharing and DMRS bundling is not used for the plurality of DMRSs in the at least one grant of communication resources, wherein identifying the sequence of DMRS configuration is based at least in part on determining that the DMRS sharing and the DMRS bundling is not used.

18. A method for wireless communication, comprising:
receiving at least one grant of communication resources that schedules a plurality of data channels and a plurality of demodulation reference signals (DMRSs), each data channel including one or more DMRSs of the plurality of DMRSs;
determining that DMRS bundling between the DMRSs of data channels transmitted across different slots is used;
determining a parameter of each DMRS based at least in part on a DMRS pattern configuration, the DMRS pattern configuration indicating that a first parameter of at least one DMRS is associated with a second parameter of at least one other DMRS based at least in part on determining that the DMRS bundling is used; and
communicating the plurality of DMRSs based at least in part on determining the parameter of each DMRS using the DMRS pattern configuration.

19. The method of claim 18, further comprising:
determining that DMRS sharing between channels of different mapping types associated with the plurality of DMRSs is used, wherein determining the parameter of each DMRS is based at least in part on determining that the DMRS sharing is used;
identifying a prioritization criteria based at least in part on determining that the DMRS sharing is used; and
determining that a value of the parameter of each DMRS is the same based at least in part on the prioritization criteria.

20. The method of claim 19, wherein the prioritization criteria indicates that the parameter of each DMRS is based on a configuration of a first-in-time DMRS of the plurality of DMRSs or the parameter of each DMRS is based on a configuration of a specific-type of DMRS of the plurality of DMRSs.

21. The method of claim 18, further comprising:
identifying a prioritization criteria based at least in part on determining that the DMRS bundling is used; and
determining that the parameter of each DMRS is the same based at least in part on the prioritization criteria.

22. The method of claim 21, wherein the prioritization criteria indicates that the parameter of each DMRS is based on a configuration of a first-in-time DMRS of the plurality of DMRSs or the parameter of each DMRS is based on a configuration of a specific-type of DMRS of the plurality of DMRSs.

23. The method of claim 18, further comprising:
identifying a sequence of DMRS configuration for the plurality of DMRSs based at least in part on the at least one grant of communication resources including more than one DMRS, wherein determining the parameter of each DMRS is based at least in part on identifying the sequence of DMRS configuration.

24. The method of claim 23, further comprising:
determining that DMRS sharing and DMRS bundling is not used for the plurality of DMRSs in the at least one grant of communication resources, wherein identifying the sequence of DMRS configuration is based at least in part on determining that the DMRS sharing and the DMRS bundling is not used.

25. The method of claim 18, further comprising:
receiving a negative acknowledgement (NACK) that a data channel transmitted with a first DMRS having a first configuration was not successfully decoded by a base station; and
identifying a second configuration for a second DMRS included in a re-transmitted data channel based at least in part on receiving the NACK.

26. The method of claim 18, further comprising:
determining that DMRS sharing between channels of different mapping types associated with the plurality of DMRSs is used or that DMRS bundling between different slots is used; and
determining one or more scrambling identifiers used for pseudo-random sequence initializing for the plurality of DMRSs based at least in part on determining that the DMRS sharing or the DMRS bundling is used, wherein determining the parameter of each DMRS is based at least in part on determining the one or more scrambling identifiers.

27. The method of claim 18, further comprising:
identifying a capability of a user equipment (UE) to have different DMRS configuration types across channels with different mapping types; and
enabling DMRS sharing or DMRS bundling based at least in part on identifying the capability of the UE, wherein determining the parameter of each DMRS is based at least in part on enabling the DMRS sharing or the DMRS bundling.

28. The method of claim 27, further comprising:
transmitting a message to a base station including the capability of the UE.

29. The method of claim 18, further comprising:
determining that DMRS sharing between a first channel of a first mapping type and a second channel of a second mapping type is used;
identifying a first port associated with a first DMRS of the first channel and a second port associated with a second DMRS of the second channel, the second port being different from the first port; and
communicating the first DMRS using the first port and the second DMRS using the first port and the second port, wherein the second port is code division multiplexed with the first port in the second DMRS.

30. The method of claim 18, further comprising:
determining that DMRS sharing between a first channel of a first mapping type and a second channel of a second mapping type is used;
identifying a first set of ports associated with a first DMRS of the first channel and a second set of ports associated with a second DMRS of the second channel, the second set of ports being complementary ports to the first set of ports; and
communicating the first DMRS using the first set of ports and the second DMRS using the first set of ports and the second set of ports.

31. The method of claim 18, wherein the parameter of each DMRS is a maximum quantity of DMRSs, a configuration type of a DMRS, a scrambling identifier of the DMRS, a DMRS location, a quantity of additional DMRS locations based on a length of a channel associated with the plurality of DMRSs, or a combination thereof.

32. An apparatus for wireless communication, comprising:
a processor;
memory coupled with the processor; and
instructions stored in the memory and executable by the processor to cause the apparatus to:
receive at least one grant of communication resources that schedules a plurality of data channels and a plurality of demodulation reference signals (DMRSs), each data channel including one or more DMRSs of the plurality of DMRSs;
determine that DMRS bundling between the DMRSs of data channels transmitted across different slots is used;
determine a parameter of each DMRS based at least in part on a DMRS pattern configuration, the DMRS pattern configuration indicating that a first parameter of at least one DMRS is associated with a second parameter of at least one other DMRS based at least in part on determining that the DMRS bundling is used; and
communicate the plurality of DMRSs based at least in part on determining the parameter of each DMRS using the DMRS pattern configuration.

33. The apparatus of claim 32, wherein the instructions are further executable by the processor to cause the apparatus to:
identify a sequence of DMRS configuration for the plurality of DMRSs based at least in part on the at least one grant of communication resources including more than one DMRS, wherein determining the parameter of each DMRS is based at least in part on identifying the sequence of DMRS configuration; and
determine that DMRS sharing and DMRS bundling is not used for the plurality of DMRSs in the at least one grant of communication resources, wherein identifying the sequence of DMRS configuration is based at least in part on determining that the DMRS sharing and the DMRS bundling is not used.

* * * * *